(12) United States Patent
Choi et al.

(10) Patent No.: US 9,794,878 B2
(45) Date of Patent: *Oct. 17, 2017

(54) METHOD AND APPARATUS FOR UPDATING LISTEN INTERVAL IN WIRELESS LAN SYSTEM

(71) Applicant: LG ELECTRONICS INC., Seoul (KR)

(72) Inventors: Jinsoo Choi, Anyang-si (KR); Yongho Seok, Anyang-si (KR); Jeongki Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,743

(22) Filed: Dec. 6, 2016

(65) Prior Publication Data

US 2017/0086138 A1    Mar. 23, 2017

Related U.S. Application Data

(63) Continuation of application No. 14/426,660, filed as application No. PCT/KR2013/008391 on Sep. 17, 2013, now Pat. No. 9,538,470.
(Continued)

(51) Int. Cl.
*H04W 52/02* (2009.01)
*H04W 72/04* (2009.01)
(Continued)

(52) U.S. Cl.
CPC ....... *H04W 52/0216* (2013.01); *H04W 4/005* (2013.01); *H04W 48/14* (2013.01);
(Continued)

(58) Field of Classification Search
None
See application file for complete search history.

(56) References Cited

U.S. PATENT DOCUMENTS 7,881,755 B1 * 2/2011 Mishra ............ H04W 52/0229
455/574
2004/0043797 A1    3/2004 Shostack
(Continued)

FOREIGN PATENT DOCUMENTS

EP    1684466 A1    7/2006
EP    1833199 A1    9/2007
(Continued)

OTHER PUBLICATIONS

Zhao et al, "AID Reassignment for TIM and non-TIM Modes Switching" IEEE 802.11-12/891r0, Jul. 16, 2012, 9 pages.
(Continued)

*Primary Examiner* — Ayaz Sheikh
*Assistant Examiner* — Tarell Hampton
(74) *Attorney, Agent, or Firm* — Lee Hong Degerman Kang Waimey

(57) ABSTRACT

Disclosed are a method and an apparatus for updating a listen interval in a wireless communication system. To this end, a method for updating a listen interval by a station (STA) of a wireless communication system may comprise, if an operation mode of the station is changed, a request frame including information indicating that the operation mode of the station is changed, to an access point (AP); and receiving a response frame in response to the request frame from the AP. If a value of a listen interval of the station is changed as the operation mode of the station is changed, the request frame further include a value of a new listen interval of the station.

18 Claims, 21 Drawing Sheets

| Category | Action | TIM Mode Switch | Presence of Listen interval update field (1 bit) | Listen interval update (Listen interval change) (15bits) |
|---|---|---|---|---|
| octet | 1 | 1 | 1 | 2 |

Related U.S. Application Data

(60) Provisional application No. 61/702,711, filed on Sep. 18, 2012, provisional application No. 61/704,567, filed on Sep. 24, 2012, provisional application No. 61/733,388, filed on Dec. 4, 2012, provisional application No. 61/746,565, filed on Dec. 28, 2012, provisional application No. 61/804,732, filed on Mar. 24, 2013.

(51) Int. Cl.
*H04W 48/14* (2009.01)
*H04W 4/00* (2009.01)
*H04W 84/14* (2009.01)
*H04W 84/12* (2009.01)

(52) U.S. Cl.
CPC ....... *H04W 72/04* (2013.01); *H04W 72/0413* (2013.01); *H04W 84/12* (2013.01); *H04W 84/14* (2013.01); *Y02B 60/50* (2013.01)

(56) References Cited

U.S. PATENT DOCUMENTS

| | | |
|---|---|---|
| 2005/0245215 A1 | 11/2005 | Abhishek et al. |
| 2007/0021155 A1 | 1/2007 | Yu et al. |
| 2007/0086471 A1 | 4/2007 | Igarashi et al. |
| 2007/0297438 A1 | 12/2007 | Meylan et al. |
| 2010/0226299 A1 | 9/2010 | Sumida et al. |
| 2011/0199952 A1 | 8/2011 | Seok |
| 2011/0319072 A1 | 12/2011 | Ekici et al. |
| 2012/0314636 A1* | 12/2012 | Liu .................... H04W 28/065 370/311 |
| 2013/0073746 A1 | 3/2013 | Sungh et al. |
| 2013/0128867 A1 | 5/2013 | Calcev et al. |
| 2013/0142184 A1 | 6/2013 | Wang |
| 2013/0286909 A1 | 10/2013 | Panneerselvam et al. |
| 2015/0215867 A1 | 7/2015 | Choi et al. |

FOREIGN PATENT DOCUMENTS

| | | |
|---|---|---|
| JP | 2011-217026 | 10/2011 |
| KR | 10-2011-0103201 | 9/2011 |
| KR | 10-2012-0041140 | 4/2012 |
| WO | 2012/078000 | 6/2012 |
| WO | 2012/109257 | 8/2012 |

OTHER PUBLICATIONS

European Patent Office Application No. 13839051.3, Search Report dated Apr. 26, 2016, 7 pages.

PCT International Application No. PCT/KR2013/008391, Written Opinion of the International Searching Authority dated Dec. 30, 2013, 16 pages.

Choi, J. et al., "Listen interval for sensor devices," IEEE 802.11-12/0618r0, May 2012, 9 pages.

Chitrakar, R. et al., "Extended Sleep mode for battery powered STAs," IEEE 802.11-12/0656r0, May 2012, 12 pages.

* cited by examiner

Octets :       2

FIG. 22

| Category | Action | TIM Mode Switch | Listen interval update (Listen interval change) |
|---|---|---|---| octet　　　1　　　1　　　1　　　　　　2

FIG. 23

| Category | Action | TIM Mode Switch (1bit) | Presence of Listen interval update field (1bit) | Reserved (6bits) | Listen interval update (Listen interval change) |
|---|---|---|---|---|---| octet　　　1　　　1　　　　　　　1　　　　　　　2

FIG. 24

| Category | Action | TIM Mode Switch (1bit) | Presence of Listen interval update field (1bit) | Listen interval update (Listen interval change) (14bits) |
|---|---|---|---|---| octet　　　1　　　1　　　　　　　2

METHOD AND APPARATUS FOR UPDATING LISTEN INTERVAL IN WIRELESS LAN SYSTEM

CROSS-REFERENCE TO RELATED APPLICATIONS

This application is a continuation of U.S. patent application Ser. No. 14/426,660, filed on Mar. 6, 2015, now U.S. Pat. No. 9,538,470, which is the National Stage filing under 35 U.S.C. 371 of International Application No. PCT/KR2013/008391, filed on Sep. 17, 2013, which claims the benefit of U.S. Provisional Application No. 61/702,711, filed on Sep. 18, 2012, 61/704,567, filed on Sep. 24, 2012, 61/733,388, filed on Dec. 4, 2012, 61/746,565, filed on Dec. 28, 2012, and 61/804,732, filed on Mar. 24, 2013, the contents of which are all hereby incorporated by reference herein in their entirety.

TECHNICAL FIELD

The present disclosure relates to a wireless communication system and, more particularly, to a method and apparatus for updating a listen interval in a Wireless LAN system.

BACKGROUND ART

With recent development of information communication technologies, a variety of wireless communication technologies have been developed. From among such technologies, WLAN is a technology that allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

DISCLOSURE

Technical Problem

Machine-to-machine (M2M) communication technology has been discussed as a next generation communication technology. A technical standard to support M2M communication in the IEEE 802.11 WLAN system is also under development as IEEE 802.11ah. In M2M communication, a scenario in which occasional transmission/reception of a small amount of data at a low speed in an environment including a large number of devices may be considered.

Communication in the WLAN system is performed on a medium shared by all devices. If the number of devices increases as in the case of M2M communication, a lot of time taken for a device to perform channel access may deteriorate overall system performance and obstruct each device from saving power.

An object of the present invention devised to solve the problem lies in a new mechanism to update a listen interval.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for updating a listen interval in a station (STA) of a wireless communication system, the method including transmitting, when an operation mode of the STA has changed, a request frame containing information indicating that the operation mode of the STA has changed to an access point (AP), and receiving a response frame to the request frame from the AP. Herein, when a listen interval value of the STA changes according to change of the operation mode of the STA, the request frame may further contain a new listen interval value.

In another aspect of the present invention, provided herein is a method for updating a listen interval in an access point (AP) of a wireless communication system, the method including receiving a request frame containing information indicating that an operation mode of the station (STA) is changed from the STA, and transmitting a response frame to the request frame to the STA. Herein, if a listen interval value of the STA is changed as the operation mode of the STA is changed, the request frame further contain a new listen interval value.

In another aspect of the present invention, provided herein is a station (STA) for updating a listen interval in a wireless system, including a transceiver configured to transceive a radio frequency signal with an access point (AP) for storing a Configuration Change Count value, and a processor, wherein when an operation mode of the STA is changed, the processor control the transceiver to transmit a request frame containing information indicating that the operation mode of the STA is changed to the AP and to receive a response frame in response to the request frame from the AP. Herein, if a listen interval value of the STA is changed as the operation mode of the STA is changed, the request frame further contain a new listen interval value.

In a further aspect of the present invention, provided herein is an access point (AP) for updating a listen interval in a wireless communication system, including a transceiver configured to transceive a radio frequency signal with a station (STA), and a processor, wherein the processor may control the transceiver to receive a request frame containing information indicating that an operation mode of the STA is changed from the STA and to transmit a response frame in response to the request frame to the STA. Herein, if a listen interval value of the STA is changed as the operation mode of the STA is changed, the request frame further contain a new listen interval value.

The above general description and following detailed description of the present invention are exemplarily given to supplement the recitations in the claims.

Advantageous Effects

According to one embodiment of the present invention, a new method and apparatus for updating a listen interval may be provided.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention.

FIG. 22 illustrates an example of the format of the TIM mode switch notify frame.

FIG. 23 illustrates another example of the format of the TIM mode switch notify frame.

FIGS. 24 and 25 illustrate another example of the format of the TIM Mode Switch Notify frame.

BEST MODE

Figure 1:
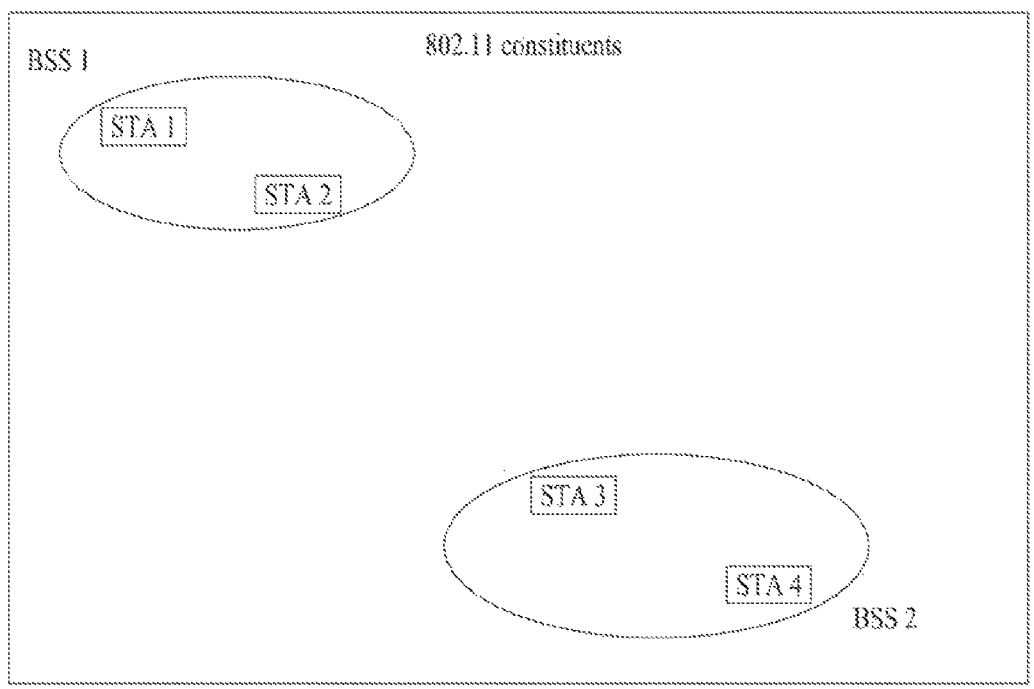
FIG. 1 is a diagram showing an exemplary structure of an IEEE 802.11 system to which the present invention is applicable.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that can be implemented according to the invention. The following detailed description includes specific details in order to provide a thorough understanding of the present invention. However, it will be apparent to those skilled in the art that the present invention may be practiced without such specific details.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Specific terms are employed in the following description for better understanding of the present invention. Such specific terms may take other forms within the technical scope or spirit of the present invention.

In some cases, well-known structures and devices are omitted in order to avoid obscuring the concepts of the present invention and important functions of the structures and devices may be mainly illustrated in the form of block diagrams.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802.20, and E-UTRA (Evolved UTRA). For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 2:
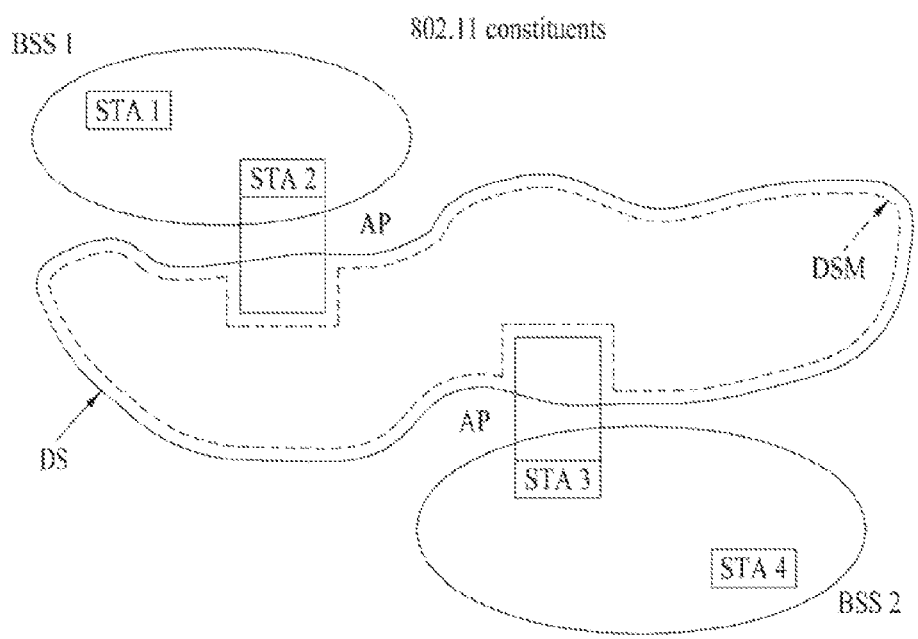
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited by physical layer (PHY) performance. In some cases, such limited distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP.

For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frames) may be transmitted to the DS.

Figure 3:
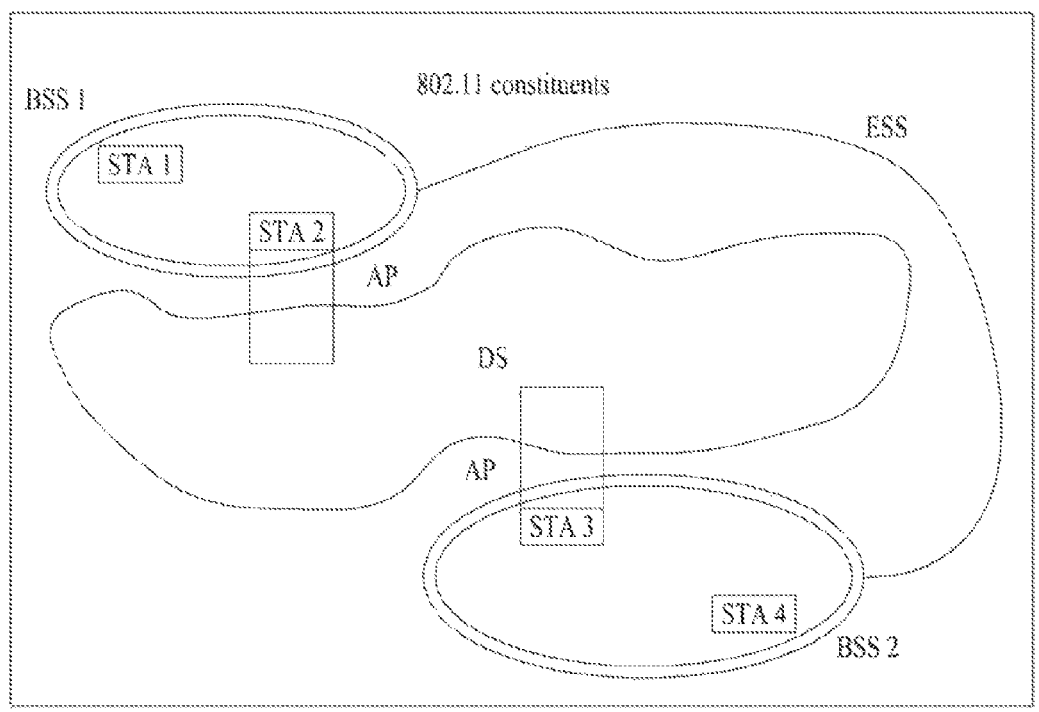
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

Regarding relative physical locations of the BSSs in FIG. 3, IEEE 802.11 does not assume any arrangement, and all the following arrangements are possible. BSSs may partially overlap and this positional arrangement is generally used to provide continuous coverage. In addition, the BSSs may not be physically connected, and a distance between BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed in the same location.

Figure 4:
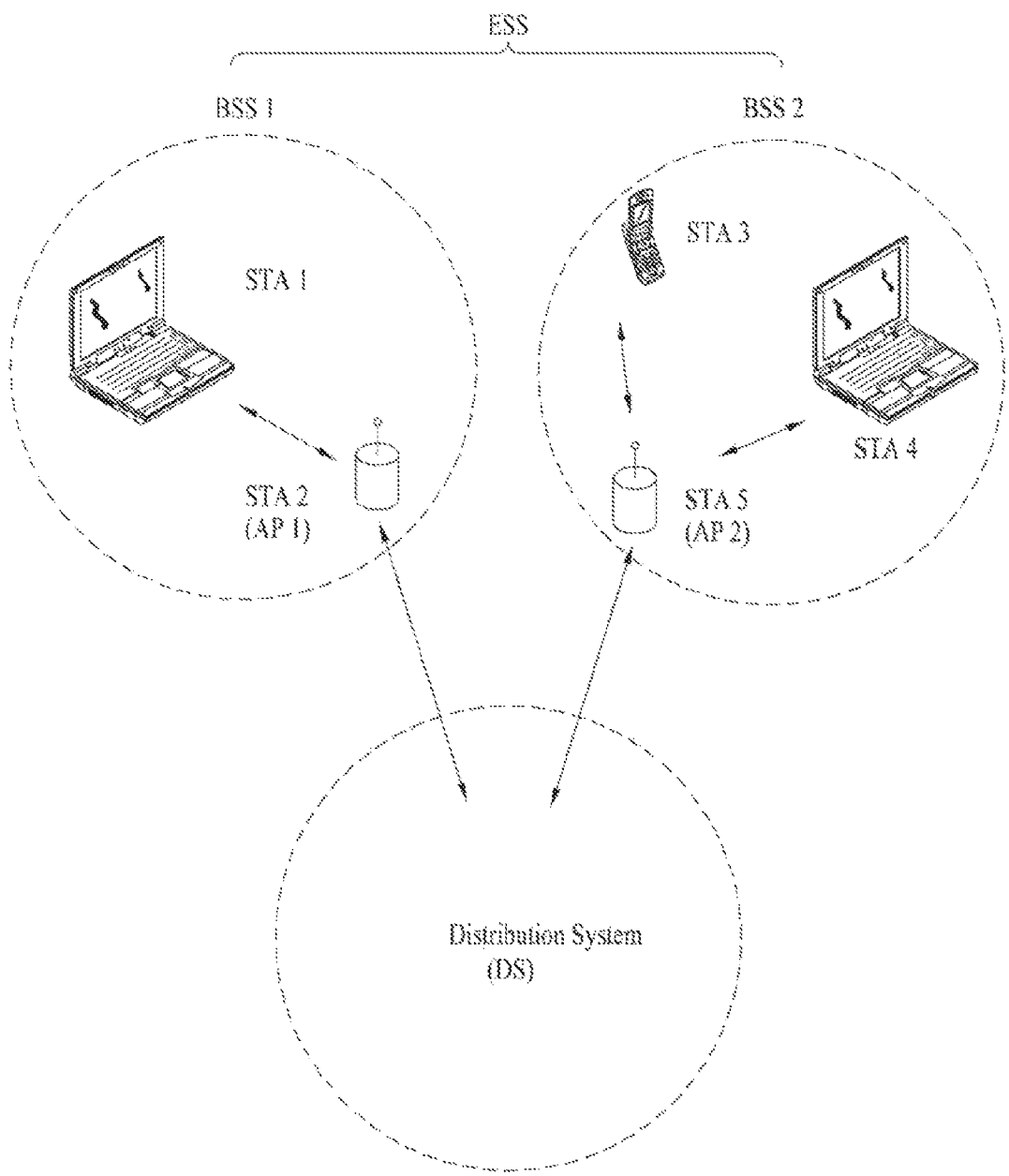
FIG. 4 is a diagram showing an exemplary structure of a WLAN system.

FIG. 4 is a diagram showing an exemplary structure of a WLAN system. FIG. 4 shows an exemplary infrastructure BSS including a DS.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA 1, STA 3, and STA 4 correspond to the non-AP STAs and STA 2 and STA 5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Link Setup Process

Figure 5:
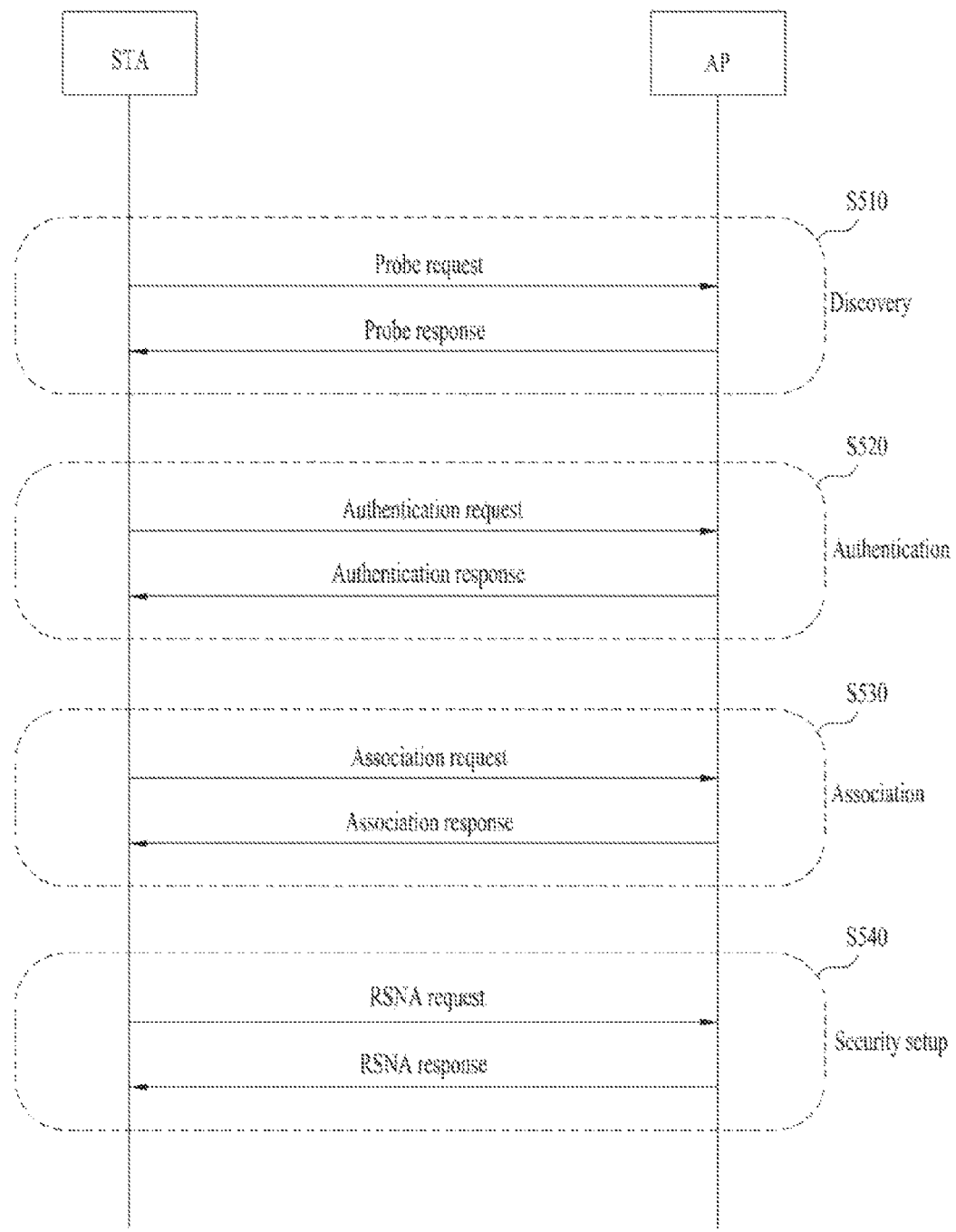
FIG. 5 illustrates a link setup process in a WLAN system.

FIG. 5 illustrates a general link setup process.

To set up a link with respect to the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 5.

In step S510, an STA may perform the network discovery operation. The network discovery operation may include a scanning operation of the STA. That is, the STA needs to search for an available network so as to access the network. The STA needs to identify a compatible network before participating in a wireless network. Herein, the process of identifying a network contained in a specific region is referred to as scanning.

The scanning operation is classified into active scanning and passive scanning.

FIG. 5 exemplarily shows the network discovery operation including the active scanning process. In the case of active scanning, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a BSS of the scanned channel. In the BSS, the AP transmits a beacon frame, and thus the AP serves as the responder. In the IBSS, STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (i.e., transmission/reception of a probe request/response on Channel #2) in the same manner.

Although not shown in FIG. 5, scanning may be carried out in the passive scanning manner. In performing the passive scanning operation, an STA to perform scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network. In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication, which is clearly distinguished from the security setup operation of step S540, which will be described later.

The authentication process may include transmitting, by the STA, an authentication request frame to an AP and transmitting, by the AP, an authentication response frame to the STA in response to the authentication request frame. The authentication frame used in transmitting an authentication request/response may correspond to a management frame.

The authentication frame may contain information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include the steps of transmitting, by the STA, an association request frame to the AP and transmitting, by the AP, an association response frame to the STA in response.

For example, the association request frame may include information related to various capabilities, a beacon listening interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a process of performing private key setup based on 4-way handshaking through an extensible authentication protocol over LAN (EAPOL) frame. In addition, the security setup process may be performed using another security scheme that is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend wireless network coverage. More specifically, IEEE 802.11n supports a high throughput (HT) of a maximum data processing speed of 540 Mbps, and is based on multiple input multiple output (MIMO) technology in which multiple antennas are used at both a transmitter and a receiver.

With widespread use of WLAN technology and diversification of WLAN applications, there has been a need for development of a new WLAN system capable of supporting higher throughput than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at a MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace is under discussion. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA need to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As examples of communication between a device and an application server, there may be communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, methods have been discussed to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS)), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
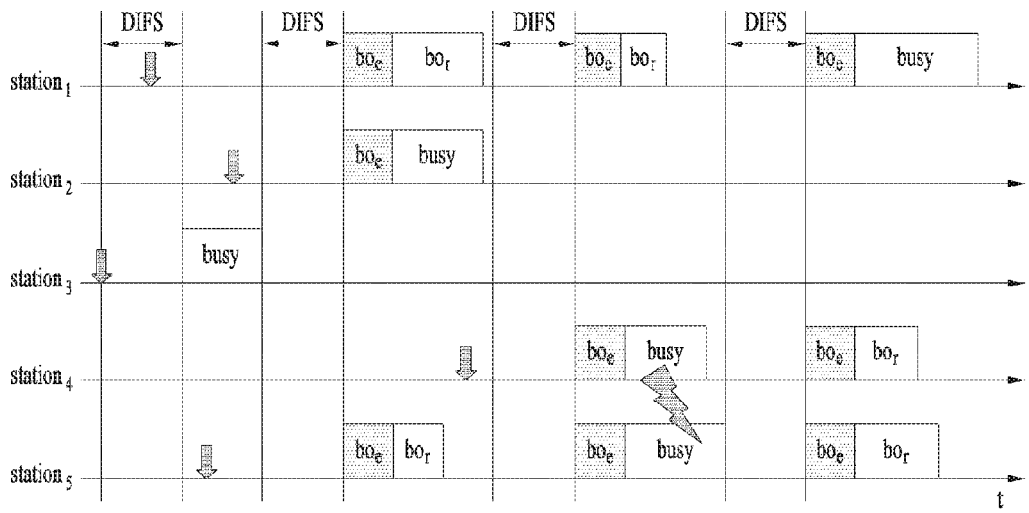
FIG. 6 illustrates a backoff process.

FIG. 6 illustrates a backoff process.

Hereinafter, operations based on a random backoff period will be described with reference to FIG. 6. If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to 2n−1 (where n=0, 1, 2, . . . ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown resumes.

In the example shown in FIG. 6, if a packet for STA3 to transmit reaches MAC of STA3, the STA3 may confirm that the medium is in the idle state in the DIFS and immediately transmit a frame. In the meantime, the other STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the lowest backoff count value and STA1 selects the highest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, neither STA4 nor STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only physical carrier sensing through which the AP and/or STA directly sense the medium, but also virtual carrier sensing. The virtual carrier sensing is performed to address some problems (such as a hidden node problem) encountered in medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time before a time at which the medium becomes available. Accordingly, the NAV value may correspond to a reserved period during which the medium is used by the AP and/or STA to transmit a frame. An STA having received the NAV value may be prohibited from accessing the medium during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
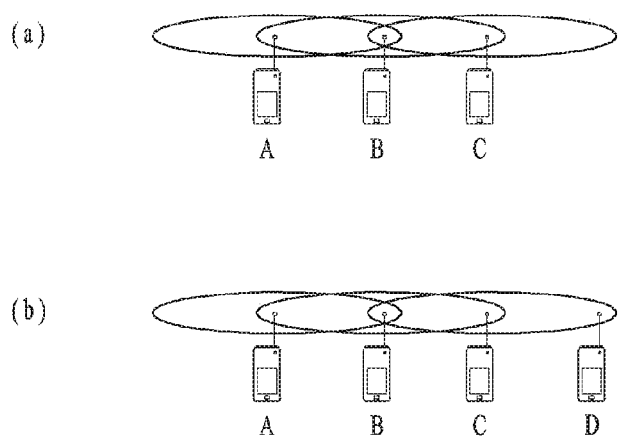
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, when STA C performs carrier sensing prior to transmission of data to STA B, STA C may determine that the medium is in the idle state even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 7(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium switches back to the idle state since the occupied state of the medium is sensed. However, since STA A is actually located out of the transmission range of STA C, transmission from STA C may not collide with transmission from STA B in view of STA A, and STA C unnecessarily waits until STA B stops transmission. In this case, STA C may be viewed as an exposed node of STA B.

Figure 8:
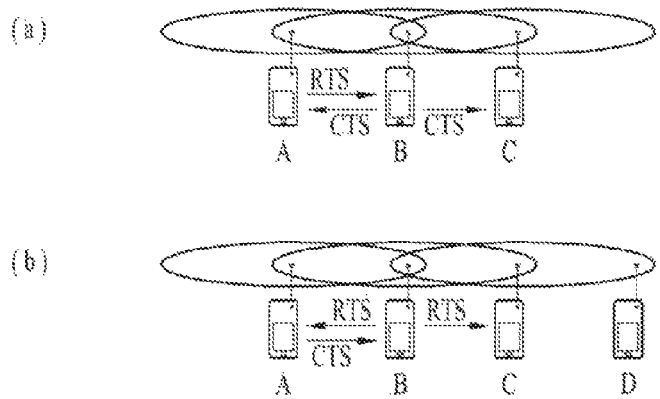
FIG. 8 illustrates RTS and CTS.

FIG. 8 illustrates RTS and CTS.

In order to efficiently use the collision avoidance mechanism in an exemplary situation as shown in FIG. 7, short-signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA that is to receive data, the STA to receive data may transmit a CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by switching between the sleep state (or doze state) and the awake state. The STA in the sleep state operates with minimum power and performs neither frame transmission/reception nor channel scanning.

As the time for which the STA operates in the sleep state increases, power consumption of the STA is reduced, and accordingly the STA operation duration increases. However, since transmission or reception of the frame is not allowed in the sleep state, the STA cannot unconditionally operate in the sleep state for a long time. When the STA operating in the sleep state has a frame to transmit to the AP, it may be switched to the awake state to transmit/receive the frame. On the other hand, when the AP has a frame to transmit to the STA which is in the sleep state, the STA cannot receive the frame nor recognize the presence of the frame. Accordingly, in order to recognize presence or absence of a frame to be transmitted to the STA (or in order to receive the frame if the frame is present), the STA may need to switch to the awake state according to specific periodicity.

Figure 9:
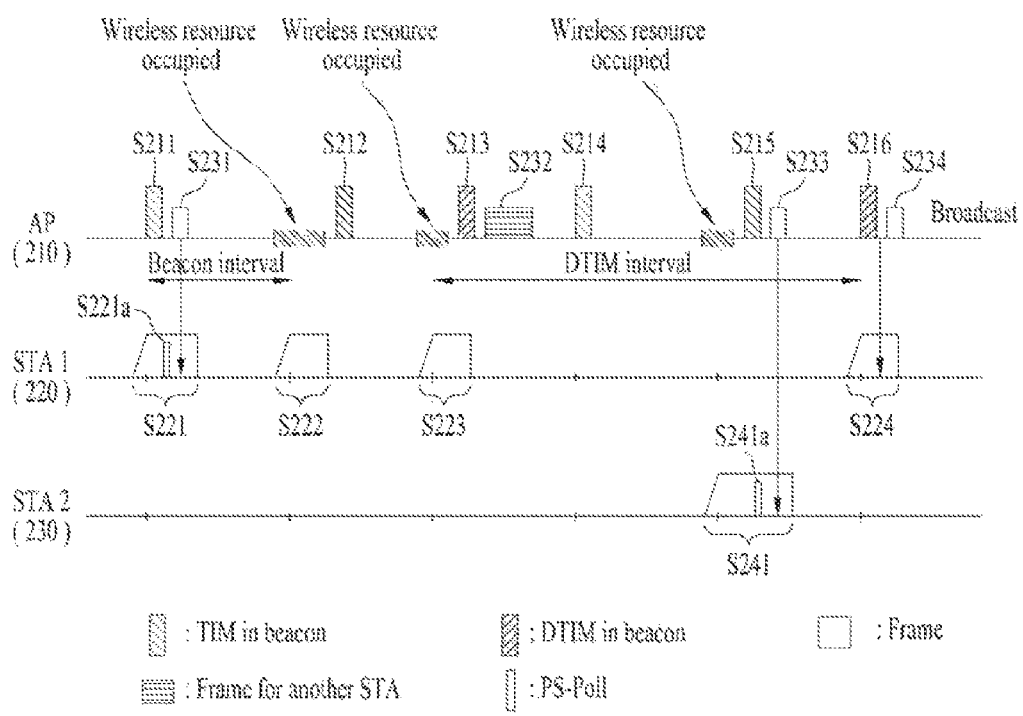
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA1 220 and STA2 222 are STAs operating in the PS mode. Each of STA1 220 and STA2 222 may be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save (PS)-Poll frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state and operates in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 may be switched to the awake state in accordance with the beacon interval and acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and switch back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it has failed to acquire information indicating presence of buffered traffic for STA1 220 through the previous two operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element, rather than being set to be switched between the operating states at every beacon interval. Therefore, when the AP 210 fifthly transmits the beacon frame (S215) after the fourth transmission of the beacon frame (S214), STA1 220 remains in the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set for STA2 230 may have a longer period than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241*a*). The AP 210 may transmit a frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
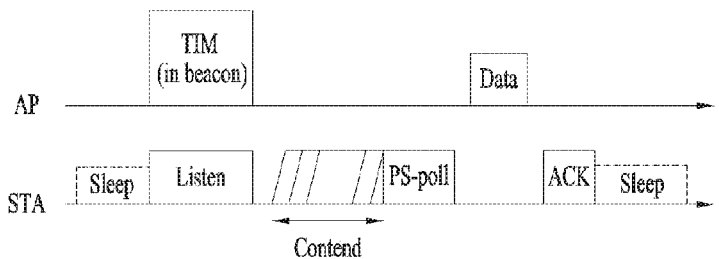
FIGS. 10 to 12 illustrate operations of a station (STA) having received a TIM in detail.
Figure 11:
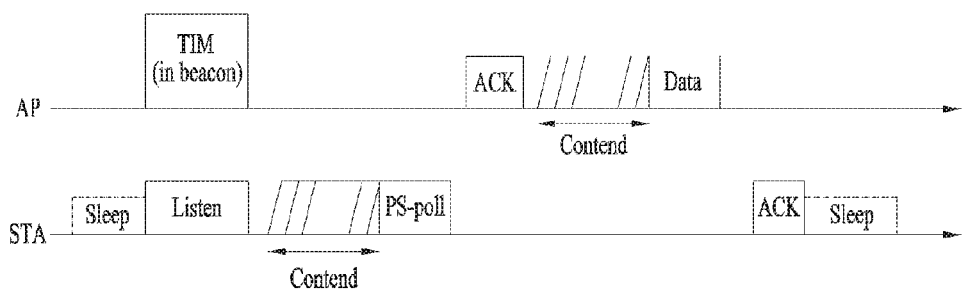
Figure 12:
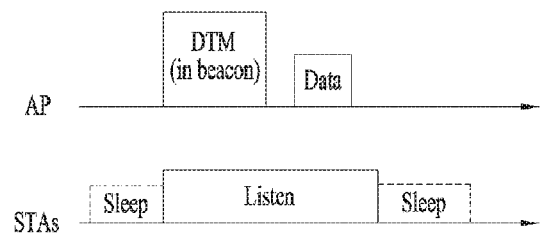

FIGS. 10 to 12 illustrate operations of an STA having received a TIM in detail.

Referring to FIG. 10, an STA is switched from the sleep state to the awake state to receive the beacon frame including a TIM from the AP. The STA may recognize presence of buffered traffic to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol illustrated in FIGS. 9 to 12, STAs may determine presence or absence of a data frame to be transmitted thereto through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem.

However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 20.

FIG. 13(a) is a diagram illustrating an exemplary AID allocated on the group basis. In FIG. 13(a), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 13(b) is a diagram illustrating another exemplary AID allocated on the group basis. In FIG. 13(b), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 13(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is cyclic or periodic according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

Figure 14:
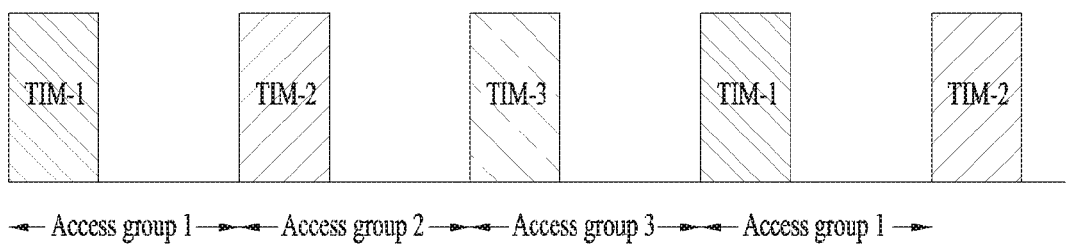
FIG. 14 illustrates an exemplary case in which an STA can restrictively attempt channel access only in the access group thereof.

If TIM elements are classified into access groups and transmitted on the group-by-group basis, the AP restrictively allows an STA to perform channel access only in the access group interval for an access group to which the STA belongs. FIG. 14 illustrates an exemplary case in which an STA can restrictively attempt channel access only in the access group thereof. To allow only an STA from a certain access group to perform channel access, the AP may transmit a beacon frame containing corresponding indication information. For example, as shown in FIG. 14, TIM element #1 may indicate that only the STAs belonging to access group 1 perform channel access, TIM element #2 may indicate that only the STAs belonging to access group 2 perform channel access, and TIM element #3 may indicate that only the STAs belonging to access group 1 perform channel access. Accordingly, as indication information designating an access group is contained in a TIM element carried in a beacon frame, the TIM element can be applied only to the designated access group.

Figure 13:
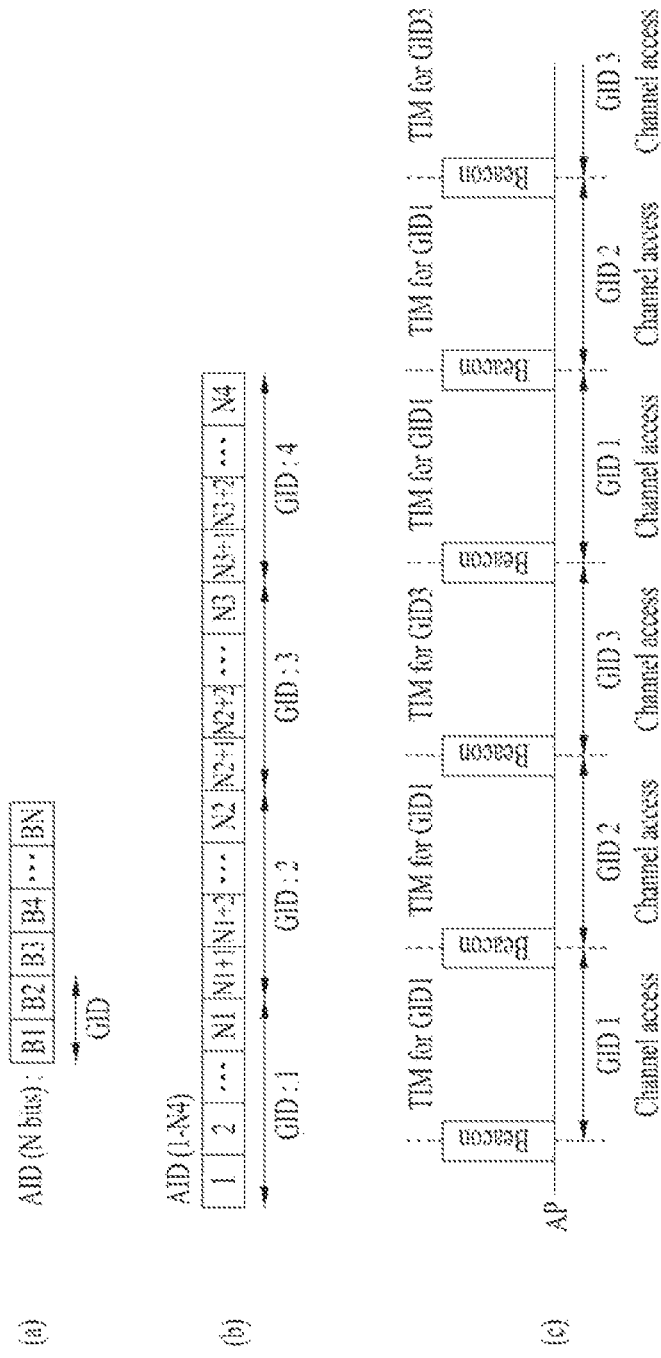
FIG. 13 illustrates a group-based AID.

The group-based AID allocation scheme as described above may also be called hierarchical structure of TIM. That is, the whole AID space may be divided into ap plurality of blocks, and only STA(s) corresponding to a specific block set to a value other than 0 (namely, STA(s) of a specific group) may be allowed to perform channel access. Dividing a TIM of a large size into small blocks/groups as above may allow the STA to easily maintain TIM information and also facilitate management of the blocks/groups according to the class, quality of service (QoS), or purpose of the STA. While FIG. 13 illustrates a 2-level hierarchical structure, a TIM may be configured to have a hierarchical structure having two or more levels. For example, a whole AID space may be divided into a plurality of page groups, each page group may be divided into a plurality of blocks, and each block may be divided into a plurality of sub-blocks. In this case, as an extended version of the example of FIG. 13(a), an AID bitmap may be configured such that first N1 bits represent the page ID (i.e., PID), the next N2 bits indicate the block ID, the next N3 bits following the N2 bits represent sub-block ID, and the other bits represent the bit position of the STA in a sub-block.

In the embodiments of the present invention described below, various methods to divide STAs (or AIDs allocated to the STAs) into predetermined hierarchical groups and manage the groups may be adopted, and the group-based AID allocation scheme is not limited to the examples above.

PPDU Frame Format

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Listen Interval

The listen interval is used to signal, to the AP, how often an STA set in the power save mode wakes up and listens to a beacon frame (or beacon management frame). The listen interval is determined by the STA based on the traffic pattern, service type and capabilities of the STA. Accordingly, it is preferable for the STA to set the listen interval to a proper value according to the condition thereof and inform the AP of the set listen interval, rather than allowing the AP to inform of the listen interval. In some cases, however, the AP may determine the listen interval and inform the STA of the determined listen interval. In the sense that the listen interval indicates intervals at which the STA wakes up to receiver a beacon frame, the listen interval may be called wakeup interval.

The parameter value of the listen interval may be provided to the AP via the association request procedure (or an association request frame). Specifically, the parameter value of the listen interval may be defined by the listen interval parameter of an MLME-ASSOCIATE.request primitive or MLME-REASSOCIATE.request primitive, and may be represented as units of beacon interval (i.e., a multiple of the beacon interval).

Figure 15:
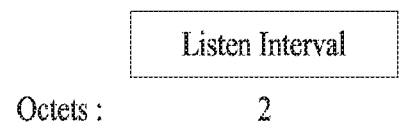
FIG. 15 illustrates a Listen Interval field.

FIG. 15 illustrates a Listen Interval field. As shown in FIG. 15, the Listen Interval field may be two octets in length, but embodiments of the present invention are not limited thereto. The parameter value of the listen interval may be set to 0. If the parameter value is 0, this may mean that the STA never enters the power save mode.

If the listen interval is very long, it may be difficult to define the listen interval with two octets. In this case, a scaling factor may be applied in defining the parameter value of the listen interval.

Figure 16:
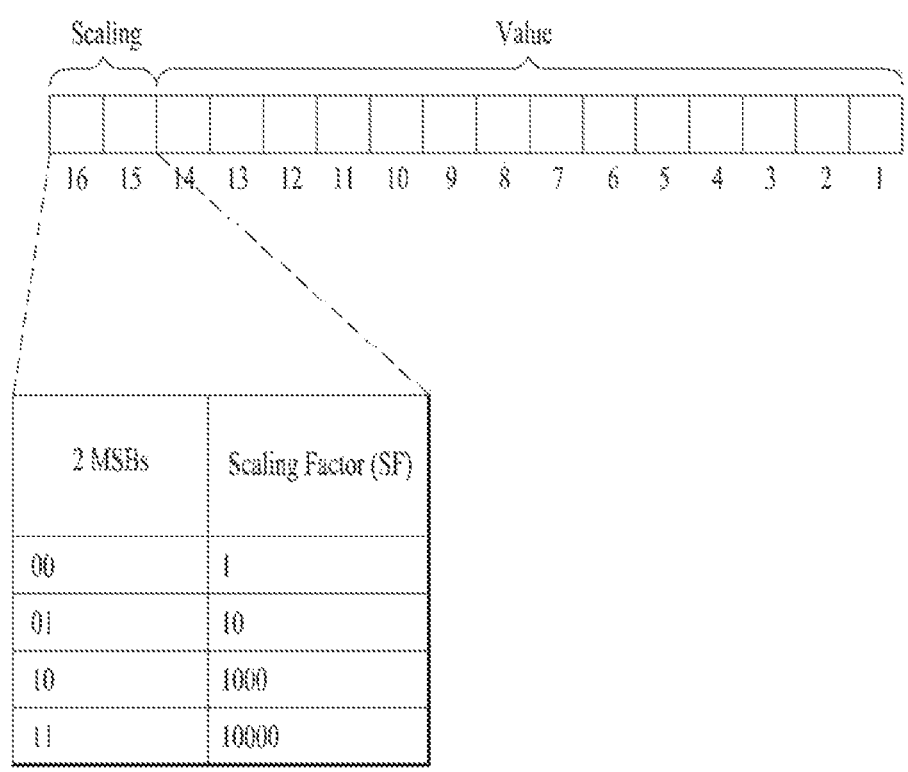
FIG. 16 illustrates an example of application of a scaling factor.

FIG. 16 illustrates an example of application of a scaling factor. As shown in FIG. 16, a scaling factor may be applied to the two leading bits (i.e., 2 most significant bits (MSBs)) of the Listen Interval field, and the actual value of the listen interval may be applied to the other 14 bits. The parameter value of the listen interval can be computed by multiplying the actual value by the scaling factor. For example, if the value of the two MSBs is '10', the parameter value of the listen interval can be computed by multiplying the actual value applied to the remaining 14 bits by the scaling factor '1000' indicated by the two MSBs set to '10'. FIG. 16 provides, (00, 1), (01, 10), (10, 1000), and (11, 10000) as examples of pairs of values of the two MSBs and a scaling factor. These examples are simply illustrative and are not intended to limit the present invention.

The scaling factor used to determine the value of the listen interval may be a unified scaling factor which can be commonly applied to the BSS maximum idle period and the WNM-Sleep interval.

The AP may determine the buffer lifetime of data (more specifically, downlink data) for an STA using the parameter value of the listen interval. For example, when data for the STA is generated, the AP may need to use the parameter value of the listen interval to keep the data buffered at least until the next time the STA wakes up.

TIM Mode and Non-TIM Mode

An STA may operate in either the TIM mode or the non-TIM mode depending on traffic pattern and service type. An STA operating in the TIM mode may check a TIM entry through the beacon frame transmitted from the AP and perform channel access. An STA operating in the non-TIM mode may perform channel access without checking a TIM entry through the beacon frame. Specifically, a non-TIM mode STA may not need to wake up in every listen interval to receive a beacon frame, but may wake up at least once per beacon frame and transmit a PS-Poll frame (or trigger frame) to the AP, thereby checking whether or not the AP has buffered data.

Figure 17:
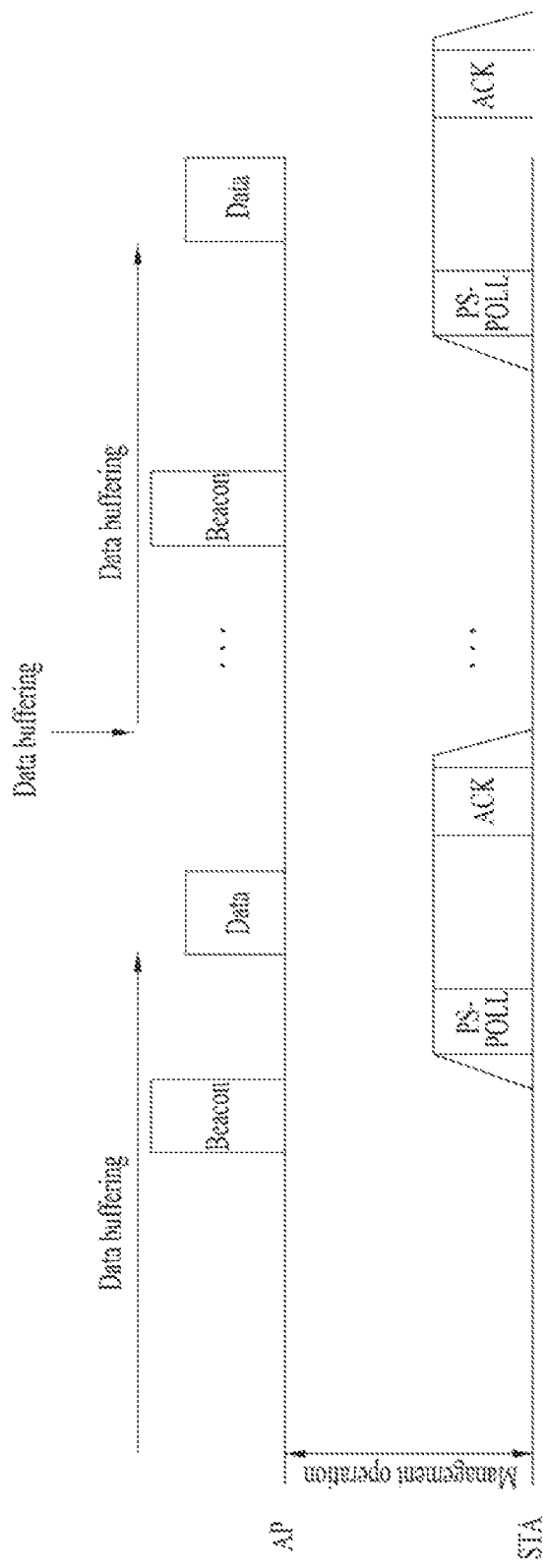
FIG. 17 illustrates an STA channel access method in a non-TIM mode.

FIG. 17 illustrates an STA channel access method in a non-TIM mode. As shown in FIG. 17, the AP may store downlink data to be transmitted to a non-TIM mode STA until it receives PS-Poll from the STA. Since the non-TIM STA can transmit PS-Poll without being constrained by the TIM, it may transmit the PS-Poll to the AP at any time. Once the AP receives the PS-Poll from the non-TIM STA, it may transmit the downlink data stored therein to the STA and then receive an ACK frame from the STA.

Since the AP cannot pre-recognize the time at which the non-TIM mode STA will transmit PS-Poll, it may need to prepare and store downlink data in the process of negotiation/association with the STA from the time the AP receives operation information about the STA (e.g., information indicating whether the STA operates in the TIM mode or the non-TIM mode) or the time the downlink data for the STA is generated until the downlink data is transmitted to the STA.

In the case of STAs such as meter type STAs or sensor type STAs, it may be more advantageous in minimizing power consumption to operate in the non-TIM mode in which the STA stays in the sleep mode for a long time and wakes up for a short time to perform channel access at constant intervals.

An STA may inform the AP, through the association request procedure, of whether the STA is set to operate in the TIM mode or the non-TIM mode. In this case, the STA may switch between the set operational mode and the other operational mode as necessary during operation. For example, even if an STA is to operate in the non-TIM mode, it may need to receive a beacon frame at least once from the AP to acquire system information. Accordingly, the STA may operate in the TIM mode at the initial stage to receive a beacon frame, and then later operate in the non-TIM mode in which reception of a beacon frame is not performed.

Allocation and Change of AID

When the operation mode of the STA changes (for example, from the non-TIM mode to the TIM mode or from the TIM mode to the Non-TIM mode), an AID may be reallocated to the STA.

Figure 18:
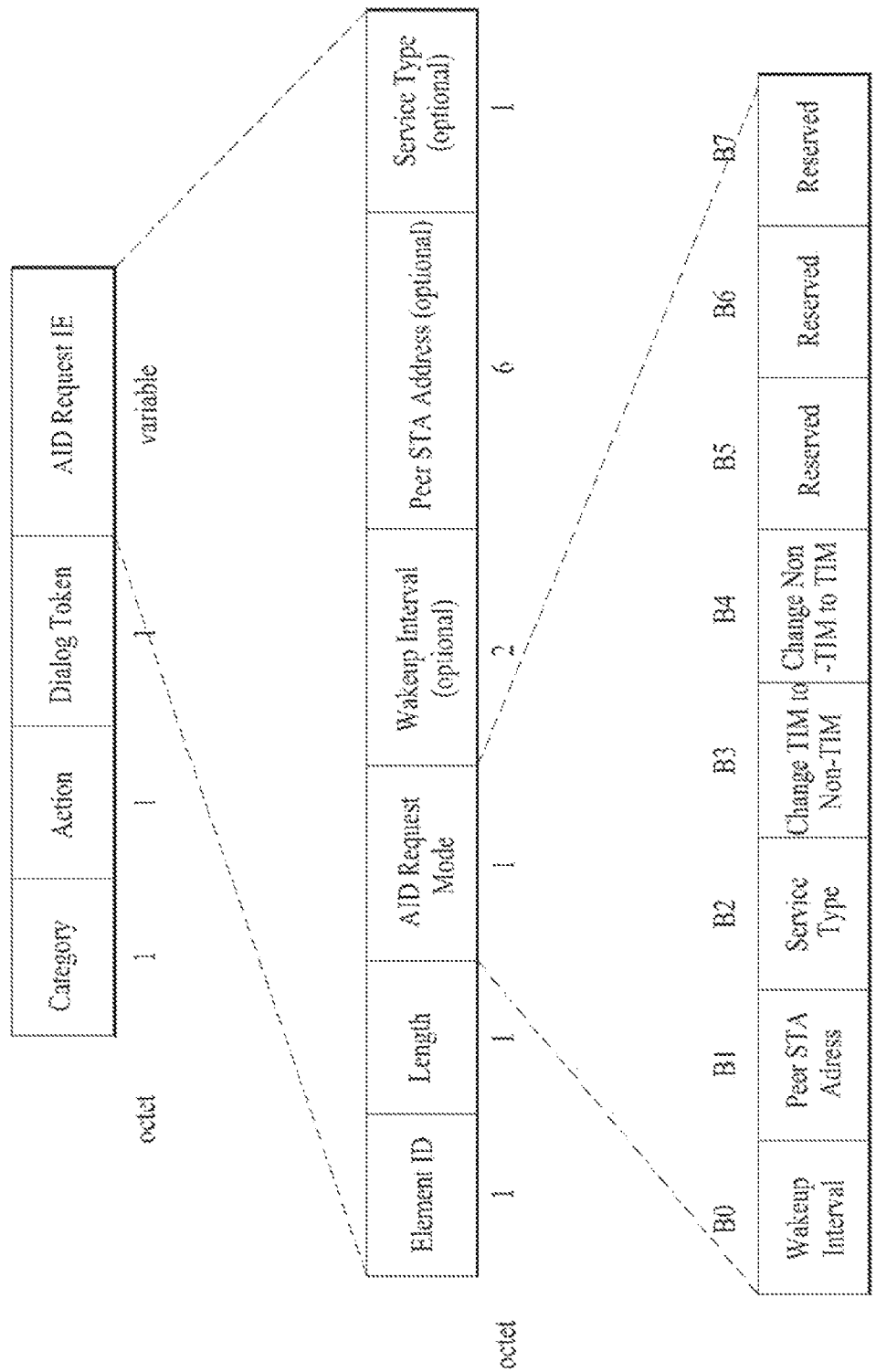
FIG. 18 illustrates the format of an AID switch request frame.

An STA that needs an AID reallocated thereto may request that the AP reallocate an AID by transmitting an AID switch request frame to the AP. FIG. 18 illustrates the format of an AID switch request frame. As shown in FIG. 18, the AID switch request frame may include a Category field, an Action field, a Dialog Token field, and an AID Request Information Element (IE).

Herein, the AID Request IE may include an Element ID field, a Length field, an AID Request Mode field, a Wakeup Interval field, a Peer STA Address field, and a Service Type field. The Wakeup Interval field, Peer STA Address field, and Service Type field may be optionally included in the AID Request IE when necessary.

The AID Request Mode field may indicate whether or not the optional fields are included in the AID Request IE. For example, each bit of the AID Request Mode field may be defined as follows.

Bit B0: Indicates whether or not the Wakeup Interval field is included (For example, if the value of bit B0 is 1, this may indicate that the Wakeup Interval field is included in the AID Request IE).

Bit B1: Indicates whether or not the Peer STA Address field is included (For example, bit B1 set to 1 may indicate that the Peer STA Address field is included in the AID Request IE, and bit B1 set to 0 may indicate that the Peer STA Address field is not included in the AID Request IE).

Bit B2: Indicates whether or not the Service Type field is included (For example, bit B2 set to 1 may indicate that the Service Type field is included in the AID Request IE, and bit B2 set to 0 may indicate that the Service Type field is not included in the AID Request IE).

Bit B3: Indicates whether or not the STA has switched from the TIM mode to the non-TIM mode (For example, bit B3 set to 1 indicates that the STA has switched from the TIM mode to the non-TIM mode, and bit B3 set to 0 indicates the STA has not switched between the modes).

Bit B4: Indicates whether or not the STA has switched from the non-TIM mode to the TIM mode (For example, bit B4 set to 1 indicates that the STA has switched from the non-TIM mode to the TIM mode, and bit B4 set to 0 indicates the STA has not switched between the modes).

Bits B5-B7: Reserved

The Wakeup Interval field may contain information about a new wakeup interval of the STA. Here, the wakeup interval may be represented in units of beacon intervals.

The Peer STA Address field may contain MAC address information about an STA for STA-to-STA communication.

The Service Type field may contain information about a new service type of the STA.

Upon receiving the AID switch request frame from the STA, the AP may transmit an AID switch response frame in response to the request from the STA, thereby allocating a new AID to the STA.

Figure 19:
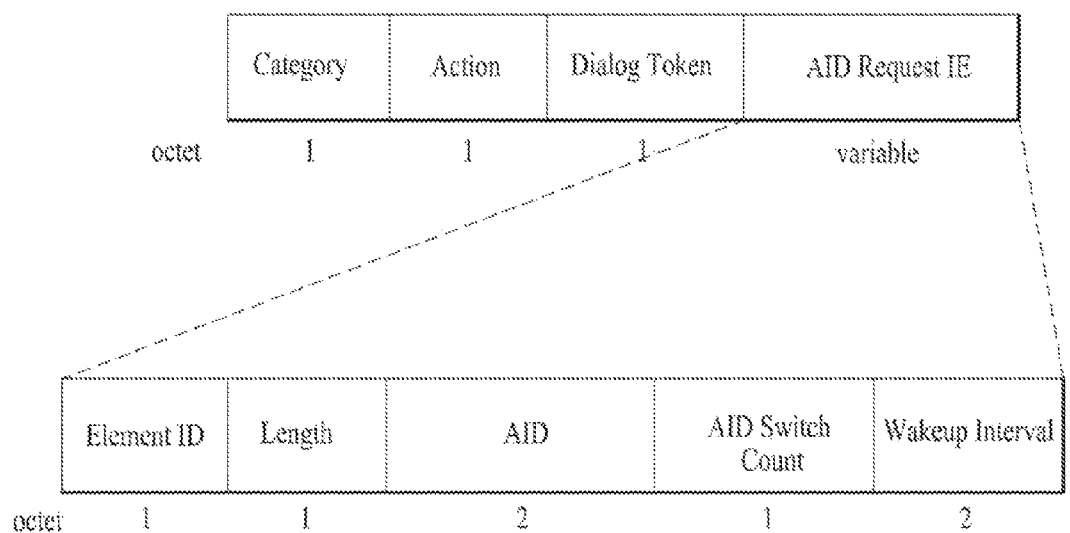
FIG. 19 illustrates the format of an AID switch response frame.

FIG. 19 illustrates the format of the AID switch response frame. As shown in FIG. 19, the AID switch response frame may include a Category field, an Action field, a Dialog Token field, and an AID Response IE. Herein, the AID Response IE may include an Element ID field, a Length field, an AID field, an AID Switch Count field, and a Wakeup Interval field.

The AID field may contain a new AID value which the AP is to allocate to the STA. If the AP does not desire to change the AID of an STA that has requested reallocation of the AID, the AID field may contain the same AID value as previously allocated to the STA.

The AID Switch Count field may indicate the number of beacon intervals remaining until the STA switches to a new AID.

The Wakeup Interval field may indicate a wakeup interval in units of beacon intervals for listening to a beacon frame having a TIM segment of the new AID.

Update of Listen Interval

When the operation mode of the STA changes (from the non-TIM mode to the TIM mode or from the TIM mode to the non-TIM mode), the listen interval of the STA may also change. For example, the non-TIM mode may focus on (extreme) reduction of power consumption compared to the TIM mode, and thus the listen interval of the STA in the non-TIM mode may be set to be longer than the listen interval of the STA in the TIM mode. If the listen interval of the STA changes according to change of the operation mode of the STA, the AP needs to be updated with the changed listen interval. If the changed listen interval of the STA is not known to the AP, the AP cannot determine how long it should buffer the traffic for the STA, which results in inefficient use of resources. Hereinafter, a detailed description will be given of a problem which may occur when the operation mode of the STA changes without listen interval update.

Figure 20:
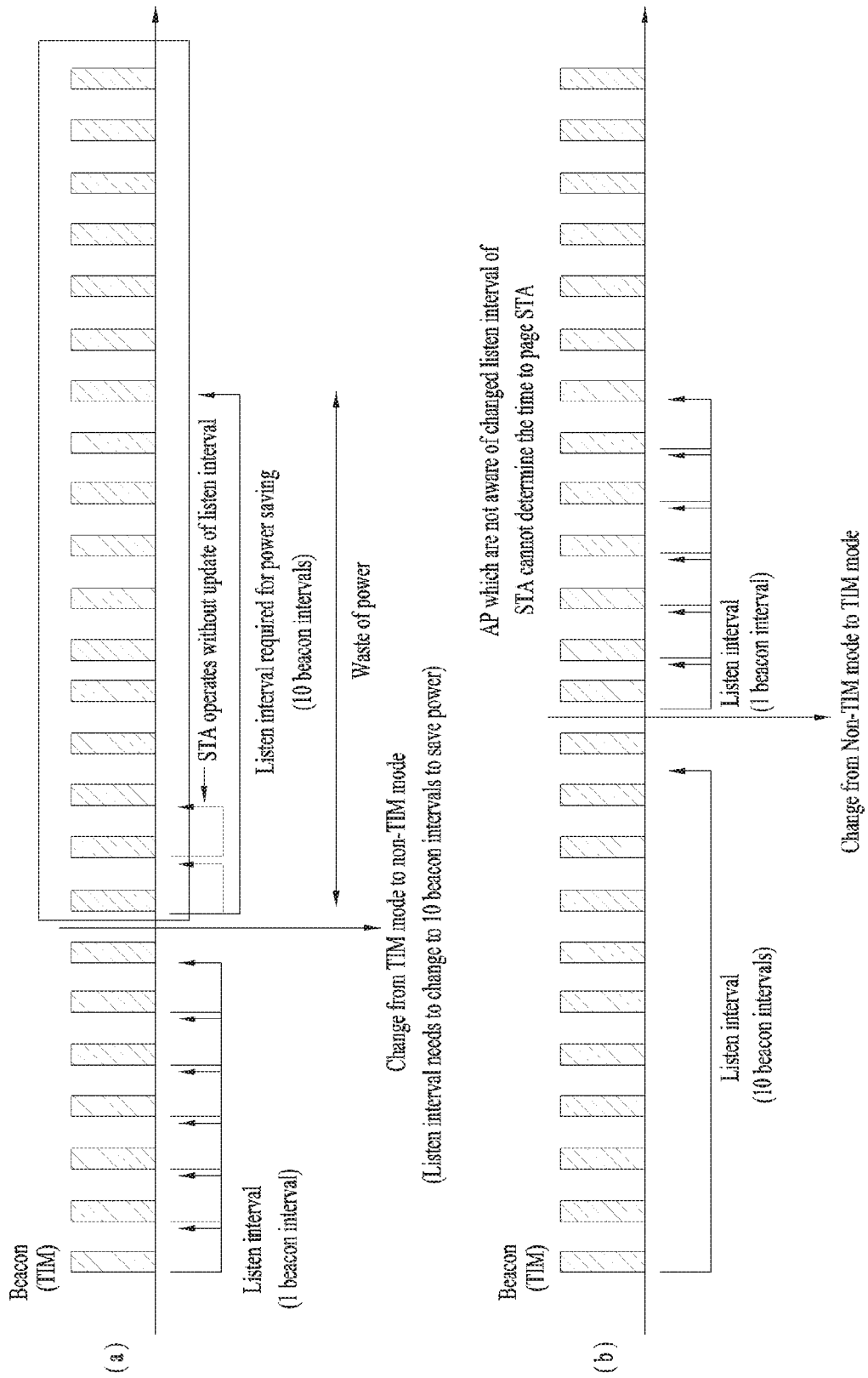
FIG. 20 illustrates a problem which may occur when the STA changes the listen interval.

FIG. 20 illustrates a problem which may occur when the STA changes the listen interval. FIG. 20(*a*) illustrates a case in which the STA operating in the TIM mode switches to the non-TIM mode, FIG. 20(*b*) illustrates a case in which the STA operating in the non-TIM mode switches to the TIM mode.

In FIG. 20(*a*), when it is assumed that the listen interval of an STA set to the TIM mode is set to 1 beacon interval, the STA will receive a beacon frame every beacon interval. Then, suppose that the operation mode of the STA has changed from the TIM mode to the non-TIM mode at a specific time. In this case, if the STA still operates every beacon interval while the listen interval that is required for the STA in the non-TIM mode to save power is at least 10 beacon intervals, excessive power consumption may occur in the non-TIM mode STA.

Moreover, if the AP is not informed that the listen interval of the STA has changed, the AP cannot know when the STA having switched to the non-TIM mode attempts channel access, and accordingly cannot determine how long the AP should buffer the data for the STA.

In FIG. 20(*b*), when it is assumed that the listen interval of an STA set to the TIM mode is set to 10 beacon intervals, the STA may wake up at least once and attempt channel access every 10 beacon intervals. Thereafter, if the operation mode of the STA switches from the non-TIM mode to the TIM mode at a specific time, and the listen interval changes to 1 beacon interval, the STA having switched to the TIM mode will be able to receive a beacon frame at every beacon interval.

In this case, if the AP is not informed that the listen interval of the STA has changed, it cannot know when the STA will listen to the beacon frame, and accordingly cannot determine whether or not to construct a TIM element to indicate a time at which the data for the STA is buffered. In the case of FIG. 20(b), however, unnecessary power consumption of the STA may not occur.

As shown in FIGS. 20(a) and 20(b), when the listen interval of the STA changes, if the AP does not know the changed listen interval, the AP cannot determine when the STA will receive the buffered data, and thus efficiency of management of data buffer of the AP may be naturally degraded.

Figure 21:
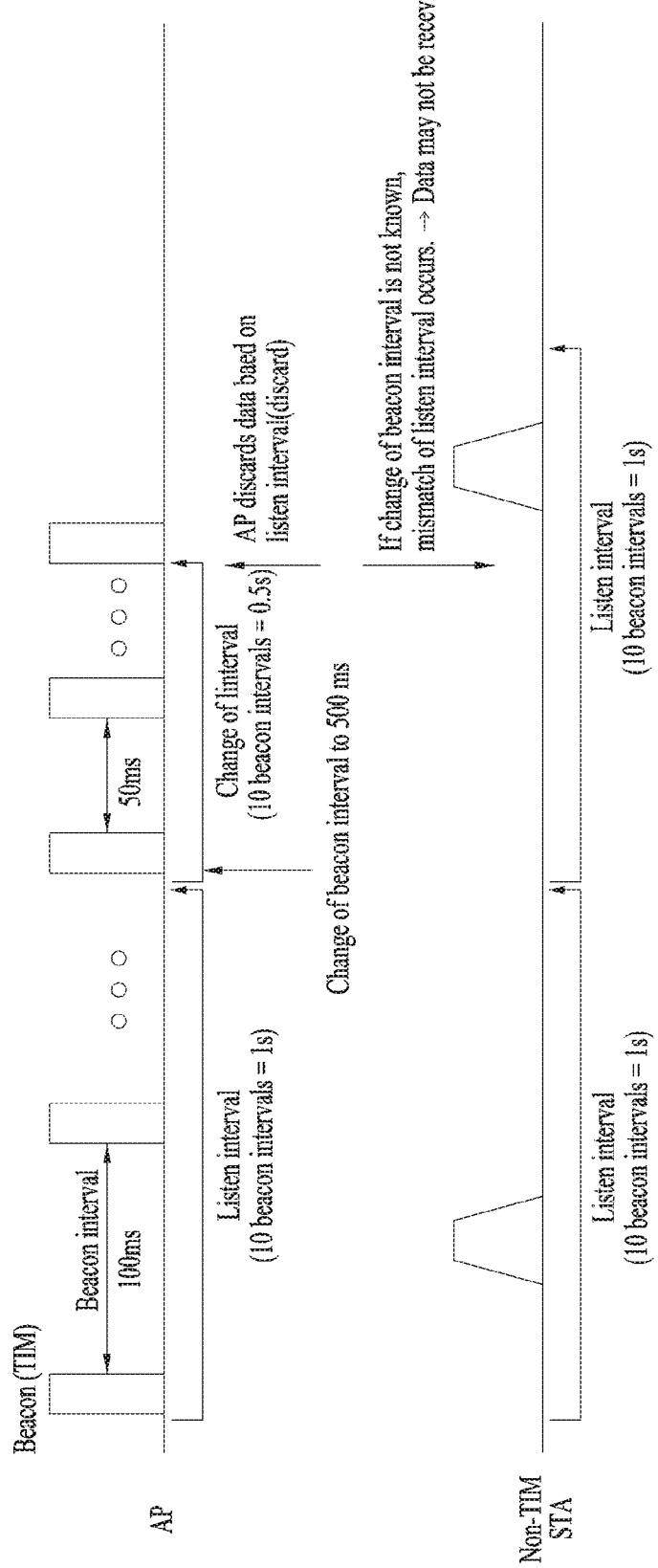
FIG. 21 illustrates a problem which may occur when an AP changes the listen interval.

FIG. 21 illustrates a problem which may occur when the AP changes the listen interval. Since the listen interval is defined as a function of beacon interval (specifically, the listen interval is defined as a multiple of a beacon interval), if the AP changes the beacon interval, the listen interval also needs to be updated. When the beacon interval changes, the AP may signal, through a beacon frame, that the beacon interval has changed.

An STA operating in the TIM mode may recognize, through a beacon frame transmitted from the AP, that the beacon interval of the AP has changed. On the other hand, an STA operating in the non-TIM mode does not receive a beacon frame transmitted from the AP and therefore cannot recognize change of the beacon interval.

Accordingly, the STA operating in the non-TIM mode cannot update the listen interval thereof according to change of the beacon interval, and thus mismatch between the AP and the STA may occur.

Moreover, the AP may determine that the listen interval of the STA must have changed according to the changed beacon interval, and thus discard the data for the SAT buffered according to the changed listen interval. In this case, the STA which has failed to update the listen interval according to the changed beacon interval may not correctly receive data from the AP.

For example, as shown in FIG. 21, if the beacon interval is shortened from 100 ms to 50 ms, the AP may broadcast, through a beacon frame, that the beacon interval has been cut in half. Further, the AP may assume that the listen interval of the STA is cut in half according to shortening of the beacon interval. For example, if the listen interval of the STA is 10 beacon intervals, the AP may assume that the listen interval of the STA has changed from 1000 ms (10*100 ms) to 500 ms (10*50 ms). However, since the STA operating in the non-TIM mode cannot receive the beacon frame, it cannot update the listen interval according to change of the beacon interval. Accordingly, while the AP expects that the STA will attempt channel access once every 500 ms, the STA actually attempts channel access once every 1000 ms. Thereby, mismatch between the AP and the STA may occur, degrading the efficiency of management of data buffer in the AP.

In this regard, the present invention proposes a method for transmitting a changed listen interval to an AP or an STA when there is a change in the listen interval of the STA.

Embodiment 1

If the listen interval changes according to change of the operation mode of the STA, the STA may perform power management based on the updated listen interval. Specifically, if the STA switches from the TIM mode to the non-TIM mode, the STA may wake up at least once every listen interval based on the changed listen interval to transmit a PS-Poll frame (or trigger frame) to the AP. If the STA switches from the non-TIM mode to the TIM mode, the STA may wake up every listen interval based on the changed listen interval and receive a beacon frame.

If the listen interval changes according to change of the operation mode of the STA, the STA may inform the AP of the changed listen interval. Specifically, the STA may inform the AP of the value of the updated listen interval through the reassociation request frame (or procedure). If the reassociation request frame is transmitted to inform only of the changed value of listen interval, the overhead may be considerably onerous. Accordingly, the STA may inform of the updated listen interval value through a frame indicating that the operation mode of the STA has changed. Hereinafter, for simplicity of description, the frame indicating that the operation mode of the STA has changed may be termed a "TIM mode switch notify frame." However, this term is not intended to limit the present invention.

FIG. 22 illustrates an example of the format of the TIM mode switch notify frame. As shown in FIG. 22, the TIM mode switch notify frame may include a Category field, an Action field, a TIM Mode Switch field, and a Listen Interval Update (or Listen Interval Change) field.

The TIM Mode Switch field may indicate whether or not the operation mode of the STA has changed (for example, from the TIM mode to the non-TIM mode or from the non-TIM mode to the TIM mode). For example, the TIM Mode Switch field set to '1' (or '0') may indicate that the operation mode of the STA has changed, the TIM Mode Switch field set to '0' (or '1') may indicate that the operation mode of the STA has not changed. While FIG. 22 illustrates that the size of the TIM Mode Switch field is 1 octet, embodiments of the present invention are not limited thereto.

The Listen Interval Update field indicates information about the changed listen interval of the STA. The Listen Interval Update field may be 2 octets in length, the same as the existing Listen Interval field.

FIG. 23 illustrates another example of the format of the TIM mode switch notify frame. The TIM Mode Switch field shown in FIG. 22 may be replaced with a TIM Mode Switch field and a Presence of Listen Interval Update Field field as shown in FIG. 23.

Specifically, in FIG. 23, the TIM Mode Switch field may be a 1-bit indicator for indicating whether the operation mode of the STA has changed, and the Presence of Listen Interval Update Field field may also be a 1-bit indicator for indicating whether or not the Listen Interval Update field is present. The remaining space other than the TIM Mode Switch field and the Listen Interval Update field may be reserved.

For example, the listen interval update information need not be contained in the TIM Mode Switch Notify frame in a case in which the TIM Mode Switch Notify frame is transmitted to the AP even though the operation mode of the STA has not changed (e.g., the TIM Mode Switch Notify frame is transmitted in response to a request from the AP), a case in which the listen interval does not change even if the TIM mode of the STA has changed, and a case in which the STA is allowed to separately report the changed listen interval to the AP (e.g., through a reassociation request frame).

Accordingly, the STA may cause the TIM Mode Switch Notify frame to include the Presence of Listen Interval Update Field field, thereby indicating whether or not the Listen Interval Update field is included in the TIM Mode Switch Notify frame. For example, the Listen Interval Update field set to the value of '1' (or '0') may indicate that the Listen Interval Update field is included in the TIM Mode Switch Notify frame, and the Listen Interval Update field set to the value of '0' (or '1') may indicate that the Listen Interval Update field is not included in the TIM Mode Switch Notify frame.

The AP may decode the value of the Presence of Listen Interval Update Field field, thereby determining whether or not to decode the Listen Interval Update field.

In FIGS. 22 and 23, the updated listen interval value is configured with two octets as in the case of the existing Listen Interval field and included in the TIM Mode Switch Notify frame. Alternatively, the updated listen interval value may be configured to have an optimized size (e.g., 1 octet) and included in the TIM Mode Switch Notify frame.

Figure 25:
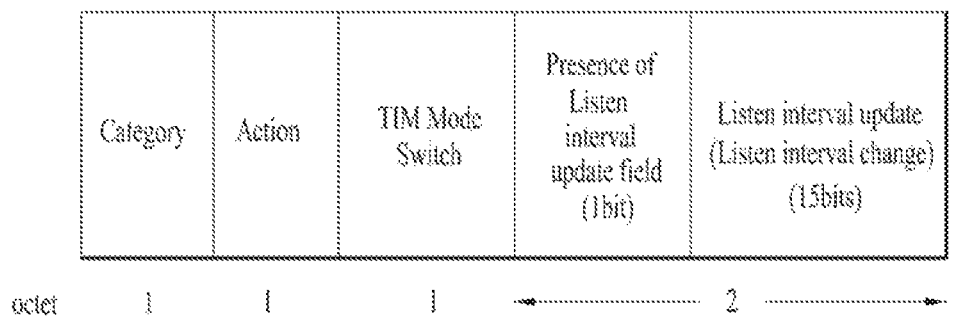

For example, FIGS. 24 and 25 illustrate another example of the format of the TIM mode switch notify frame. As shown in FIG. 24, the Listen Interval Update field may be allocated to a space other than the space occupied by the TIM Mode Switch field and the Presence of Listen Interval Update Field field. For example, as in the example shown in FIG. 24, if the TIM Mode Switch field occupies 1 bit and the Presence of Listen Interval Update Field field occupies 1 bit in 2 octets, the Listen Interval Update field may be arranged in the remaining space of 14 bits.

In another example, the Listen Interval Update field may be allocated to a space other than the space occupied by the Presence of Listen Interval Update Field field as shown in FIG. 25. For example, if the Presence of Listen Interval Update Field field occupies 1 bit in 2 octets as shown in FIG. 25, the Listen Interval Update field may occupy the remaining space of 15 bits. In this case, the TIM Mode Switch field may be 1 octet in length as in the example of FIG. 18.

Upon receiving an updated listen interval value from the STA, the AP may transmit a response frame in response, thereby confirming the listen interval update request from the STA. If an updated listen interval value has been received through a reassociation request frame, the response frame which the AP transmits may be a Reassociation Response frame. On the other hand, if the updated listen interval value has been received through the TIM Mode Switch Notify frame, the response frame which the AP transmits may be a TIM Mode Switch Notify Response frame or another specific response frame.

Figure 26:
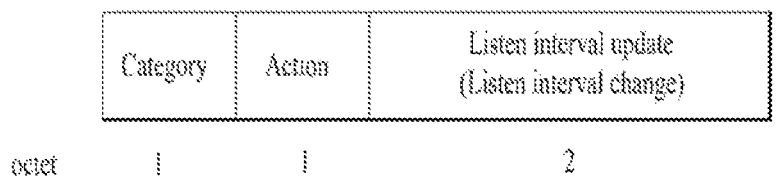
FIG. 26 illustrates an example of a Listen Interval Update frame for updating the listen interval value.

The updated listen interval value may be transmitted in a new frame format. FIG. 26 illustrates an example of a Listen Interval Update frame for updating the listen interval value. As shown in FIG. 26, the Listen Interval Update frame may contain a Category field, an Action field, and a Listen Interval Update (or Listen Interval Change) field.

Upon receiving the Listen Interval Update frame, the AP may confirm the listen interval update request from the STA through a Listen Interval Update Response frame or another specific response frame.

Figure 27:
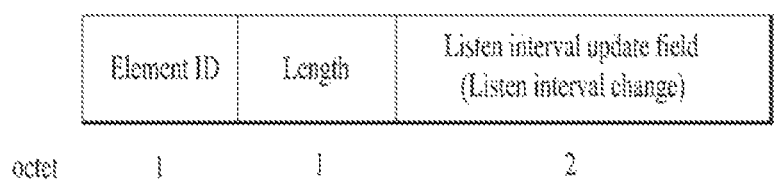
FIG. 27 illustrates an example of the listen interval update IE for updating the listen interval value.

In another example, the updated listen interval value may be carried in any frame as an IE. FIG. 27 illustrates an example of the listen interval update IE for updating the listen interval value. As shown in FIG. 27, the listen interval update IE may include an Element ID field, a Length field, and a Listen Interval Update (or Listen Interval Change) field.

This embodiment may also be applied to a case in which the listen interval changes without change of the operation mode of the STA.

Embodiment 2

Embodiment 1 illustrates that the STA can inform the AP of the updated listen interval value using a reassociation request frame or a TIM Mode Switch Notify frame. In another example, the STA may inform the AP of the updated listen interval value through an AID switch request frame which is mainly used for the STA to inform that AID of the STA has changed. This example will be described in detail with reference to FIGS. 28 and 29.

Figure 28:
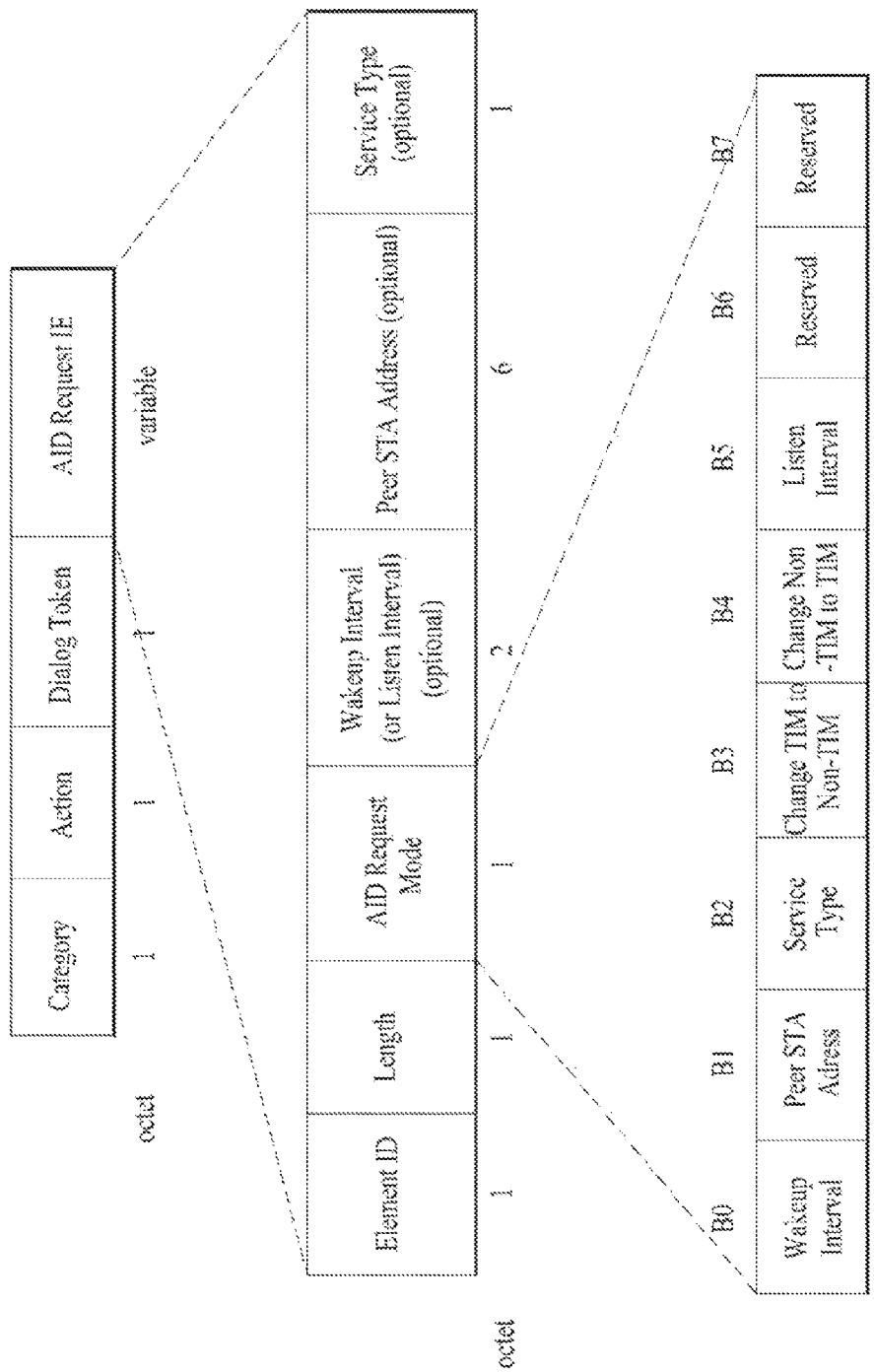
FIGS. 28 and 29 illustrate the format of an AID switch request frame according to one embodiment of the present invention
Figure 29:
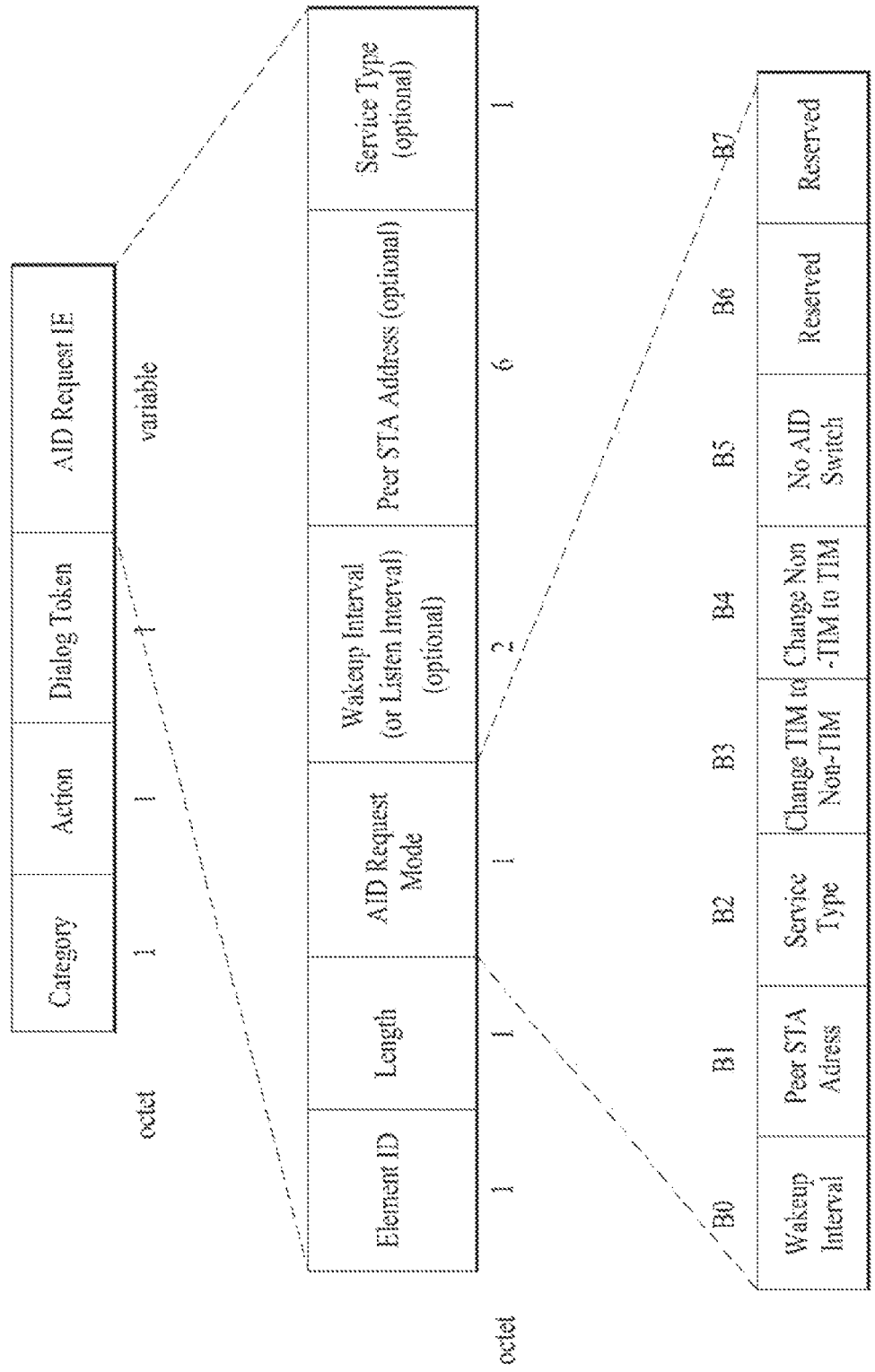

FIGS. 28 and 29 illustrate the format of an AID switch request frame according to one embodiment of the present invention.

As described above with reference to FIG. 18, the AID switch request frame may include a Category field, an Action field, a Dialog Token field, and an AID Request IE. The AID Request IE may include may include an Element ID field, a Length field, an AID Request Mode field, a Wakeup Interval field, a Peer STA Address field, and a Service Type field. The Wakeup Interval field, Peer STA Address field, and Service Type field may be optionally included in the AID Request IE when necessary.

In the case in which the listen interval of the STA has changed, the AID Request IE may include a Listen Interval field. In this case, the Listen Interval field may include a Wakeup Interval field in place of the AID Request IE as shown in FIGS. 28 and 29.

As previously described with reference to FIG. 18, each bit of the AID Request Mode field may be defined as follows.

Bit B0: Indicates whether or not the Wakeup Interval field is included (For example, bit B0 set to 1 (or 0) may indicate that the Wakeup Interval field is included in the AID Request IE, and bit B0 set to 0 (or 1) may indicate that the Wakeup Interval field is not included in the AID Request IE).

Bit B1: Indicates whether or not the Peer STA Address field is included (For example, bit B1 set to 1 (or 0) may indicate that the Peer STA Address field is included in the AID Request IE, and bit B1 set to 0 (or 1) may indicate that the Peer STA Address field is not included in the AID Request IE).

Bit B2: Indicates whether or not the Service Type field is included (For example, bit B2 set to 1 (or 0) may indicate that the Service Type field is included in the AID Request IE, and bit B2 set to 0 (or 1) may indicate that the Service Type field is not included in the AID Request IE).

Bit B3: Indicates whether or not the STA has switched from the TIM mode to the non-TIM mode (For example, bit B3 set to 1 (or 0) indicates that the STA has switched from the TIM mode to the non-TIM mode, and bit B3 set to 0 (or 1) indicates the STA has not switched between the modes).

Bit B4: Indicates whether or not the STA has switched from the non-TIM mode to the TIM mode (For example, bit B4 set to 1 (or 0) indicates that the STA has switched from the non-TIM mode to the TIM mode, and bit B4 set to 0 (or 1) indicates the STA has not switched between the modes).

Bits B5-B7: Reserved

In one example of the present invention, when the operation mode of the STA changes from the TIM mode to the non-TIM mode (for example, bit B3 is set to 1) or from the non-TIM mode to the TIM mode (for example, bit B4 is set to 1), the Listen Interval field may be set to be automatically included in the AID Request IE. Thereby, when the bit B3 or bit B4 of the AID Request Mode field indicates that the operation mode of the STA has changed, the AP may recognize that the Listen Interval field is included in the AID Request IE.

In another example, at least one of the reserved bits (i.e., B5-B7) of the AID Request Mode field may be allocated to indicate whether or not the Listen Interval field is included in the AID Request IE as shown in FIG. 28. For example, in the case in which bit B5 is allocated to indicate the Listen Interval field, bit B5 set to 1 (or 0) may indicate that the Listen Interval field is included in the AID Request IE, and bit B5 set to 0 (or 1) may indicate that the Listen Interval field is included in the AID Request IE.

Even if the operation mode of the STA changes (for example, from the TIM mode to the non-TIM mode or from the non-TIM mode to the TIM mode), the AID of the STA may remain unchanged. In order to indicate that the AID of the STA remains unchanged, at least one of the reserved bits (i.e., B5-B7) of the AID Request Mode field may be allocated to indicate whether or not the AID of the STA changes. In FIG. 29, bit B5 in the AID Request Mode field is exemplarily allocated to indicate whether or not the AID of the STA changes. For example, bit B5 set to 1 (or 0) may indicate that the AID of the STA need not change, while bit B5 set to 0 (or 1) may indicate that the AID of the STA needs to change.

Upon receiving an AID switch request frame from the STA, the AP may transmit an AID switch response frame in response. In this case, the AID switch response frame may be differently configured depending on whether or not the AID of the STA needs to change.

Figure 30:
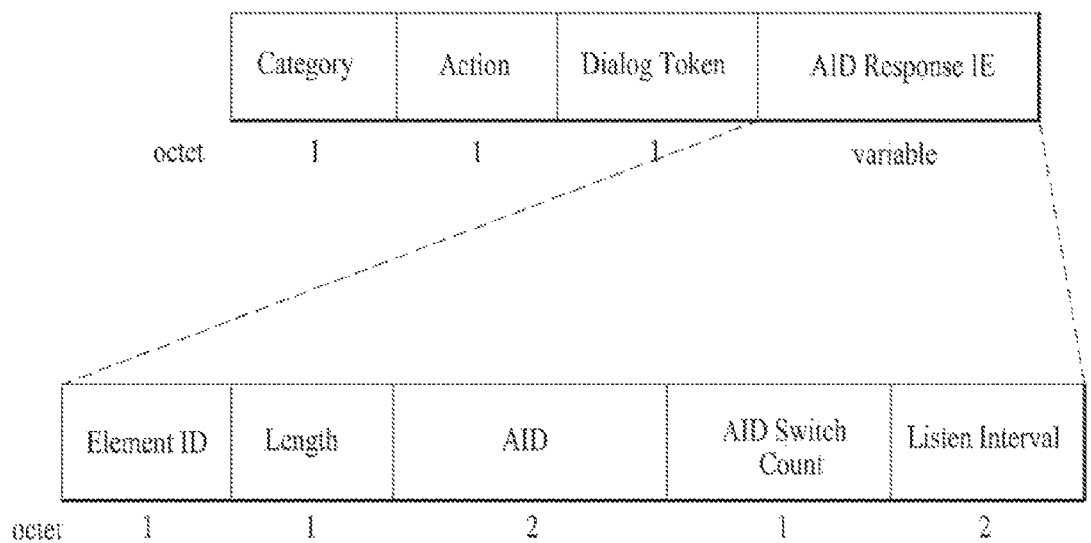
FIGS. 30 to 32 illustrate the format of an AID switch response frame according to one embodiment of the present invention.
Figure 31:
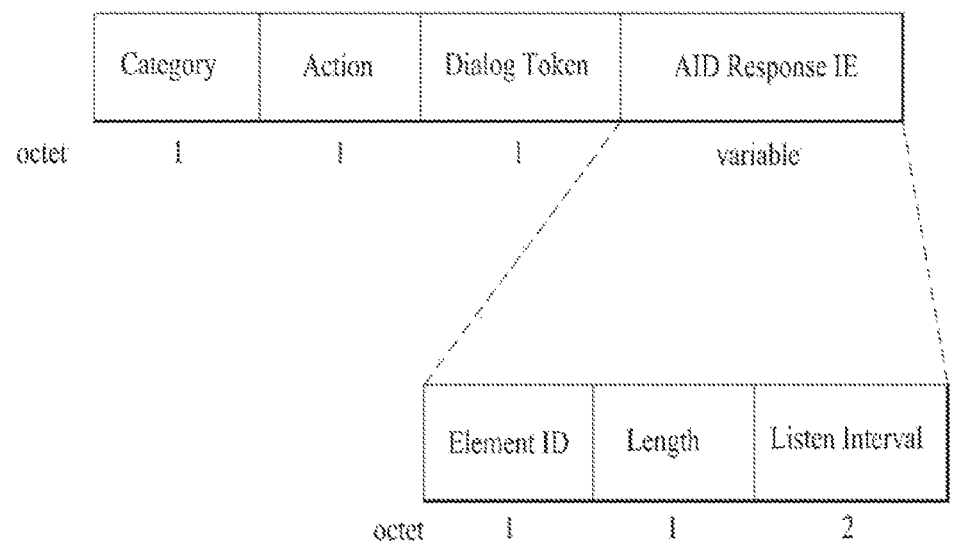
Figure 32:
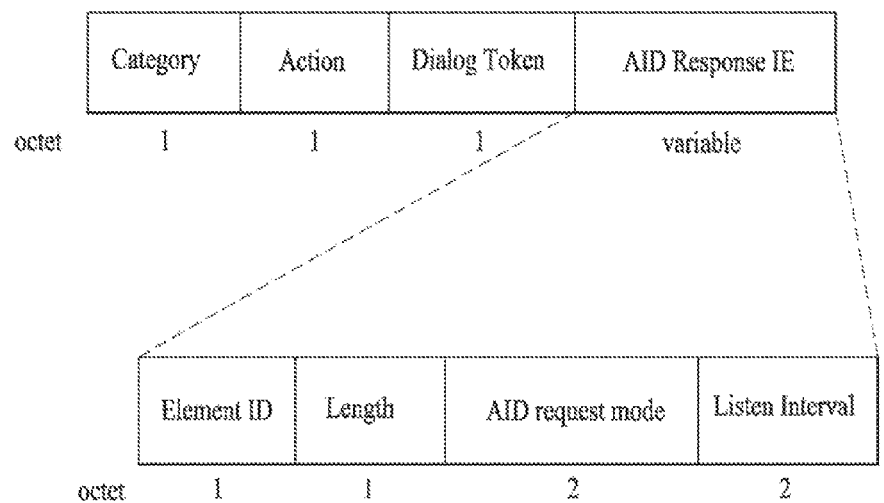

FIGS. 30 to 32 illustrate the format of an AID switch response frame according to one embodiment of the present invention. As described above with reference to FIG. 19, THE AID switch response frame may include a Category field, an Action field, a Dialog Token field, and an AID Response IE. Herein, the AID Response IE may include an Element ID field, a Length field, an AID field, an AID Switch Count field, and a Wakeup Interval field. In the case in which the AID Request IE including the Listen Interval field is received from the STA, the AID Response IE may include the Listen Interval field in place of the Wakeup Interval field as in the example shown in FIGS. 30 and 31.

If the AID of the STA needs to change when the operation mode of the STA changes (for example, if the AID Request Mode field of the AID Request IE indicates that the AID of the STA needs to change (i.e., if bit B5 shown in FIG. 29 is set to 0)), the AID Response IE may include the AID field and the AID Switch Count field as in the example shown in FIG. 30.

On the other hand, if the AID of the STA need not change (for example, if the AID Request Mode field of the AID Request IE indicates that the AID of the STA need not change (i.e., bit B5 shown in FIG. 29 is set to 1)), the AID field and the AID Switch Count field may be omitted from the AID Response IE as shown in FIG. 31. In this case, the AID response element may include only the Listen Interval field following the Length field.

As shown in FIGS. 30 and 31, in the case in which the STA having changed the operation mode requests change of the AID, unnecessary information fields (e.g., the AID field and the AID Switch Count field) may be omitted. If the STA does not request change of the AID, the AID Request Mode field for indicating that the AID of the STA does not change may be further included in the AID Response IE, as shown in FIG. 32. In this case, it may be more clearly indicated that the AID of the STA will not change.

In another example, the AID Response IE to be used may have a constant size. That is, as shown in FIG. 30, the AID Response IE may include an AID field, an AID Switch Count field, and a Listen Interval field, regardless of whether or not the STA has requested change of the AID.

As shown in FIGS. 30 and 31, the AID Response IE may include a Listen Interval field. If a listen interval value received through the AID Request IE is acceptable, the value of the Listen Interval field of the AID Request IE may be contained in the Listen Interval field of the AID Response IE.

If the listen interval value received through the AID Request IE is unacceptable (for example, if a listen interval value which is not supportable by the AP is requested), a listen interval value recommended by the AP may be contained in the Listen Interval field of the AID Response IE.

Alternatively, if the listen interval value received through the AID Request IE is unacceptable, a value indicating that the listen interval of the STA is rejected may be contained in the Listen Interval field of the AID Response IE (for example, all the bits of the Listen Interval field are set to 0).

This embodiment may also be applied to a case in which the listen interval changes without change of the operation mode of the STA.

Embodiment 3

In the case in which the beacon interval of the AP changes, and the AP, which manages a data buffer based on the listen interval value that changes according to change of the beacon interval, receives a PS-Poll frame or trigger frame from the STA, the AP may inform the STA of at least one of the updated beacon interval information and the updated listen interval information through a response frame or a separate frame.

For example, the AP may transmit a beacon interval field containing the changed beacon interval value in the response frame, or may transmit a Listen Interval field containing the changed listen interval value according to change of the beacon interval in the response frame. In this case, the response frame that the AP transmits may be an ACK frame. The ACK frame may be of a short type or an NDP type.

In another example, the AP may transmit an unsolicited AID switch response frame before or after transmitting the response frame. The unsolicited AID switch response frame may include at least one of a beacon interval field and a Listen Interval field. The AID switch response frame has the same frame format as described above with reference to FIGS. 30 and 32. In the case in which the beacon interval field is included in the AID switch response frame, the beacon interval field may be inserted in the AID Response IE in place of or together with the Listen Interval field.

According to Embodiment 3, when the AP determines that the listen interval of the STA needs to be updated, the AP updates the listen interval of the STA even if it does not separately receive a request for update of the listen interval from the STA. Accordingly, unnecessary overhead and time delay may be prevented.

Figure 33:
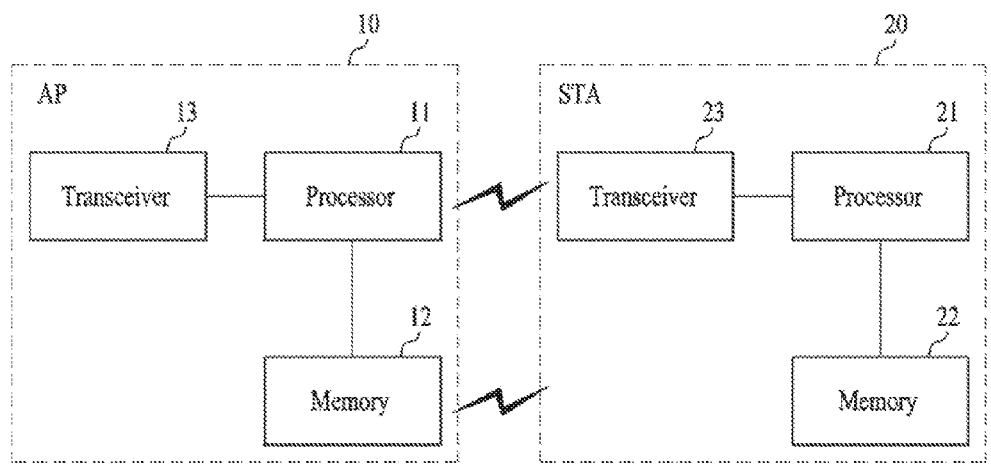
FIG. 33 is a block diagram illustrating a radio frequency apparatus according to one embodiment of the present invention.

FIG. 33 is a block diagram illustrating a radio frequency apparatus according to one embodiment of the present invention.

Referring to FIG. 33, an AP 420 includes a processor 421, a memory 422, and a transceiver 423. The processor 421 implements the proposed functions, processes, and/or methods. Layers of the wireless interface protocol (see FIG. 5) may be implemented by the processor 421. The memory 422 is connected to the processor 421 to store various kinds of information for driving the processor 421. The transceiver 423 is connected to the processor 421 to transmit and/or receiver a radio frequency signal.

An STA 430 includes a processor 431, a memory 432, and a transceiver 433. The processor 431 implements the proposed functions, processes, and/or method. Layers of the wireless interface protocol (see FIG. 5) may be implemented by the processor 431. The memory 432 is connected to the processor 431 to store various kinds of information for driving the processor 431. The transceiver 433 is connected to the processor 431 to transmit and/or receiver a radio frequency signal.

The memory 422, 432 may be disposed inside or outside the processor 421, 431, and be connected to the processor (421, 431) by a well-known means. In addition, the AP 420 and/or STA 430 may have a single antenna or multiple antennas.

In the embodiments describe above, elements and features of the present invention are combined in a predetermined form. The elements or features should be considered optional unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in anther embodiment, or may be replaced with elements or features from another embodiment. It is apparent that some of claims which do not have a dependency relationship explicitly stated may be combined to configure an embodiment or may be incorporated into a new claim through amendment after filing of this application.

Embodiments of the present invention may be implemented by various means such as, for example, hardware, firmware, software, or combinations thereof. When implemented by hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, one embodiment of the present invention may be implemented in the form of a module, a procedure, a function, or the like which performs the functions and or operations described above. Software code may be stored in the memory and executed by the processor. The memory may be disposed inside or outside the processor to transceive data with the processor through various well-known means.

It will be apparent to those skilled in the art that various modifications and variations can be made in the present invention without departing from the essential features of the present invention. Thus, the descriptions given should not be construed as being limited but considered as being illustrative. The scope of the present invention should be determined through reasonable interpretation of the appended claims. The present invention is intended to cover the modifications and variations of this invention provided they come within the scope of the appended claims and their equivalents.

INDUSTRIAL APPLICABILITY

Various embodiments of the present invention have been described through examples applied to IEEE 802.11, but they may also be equally applied to various wireless access systems other than IEEE 802.11.

The invention claimed is:

1. A method for updating a listen interval in a station (STA) of a wireless communication system, the method comprising:
   transmitting, by the STA, to an access point (AP) upon change of an operation mode of the STA, a request frame including information indicating change of the operation mode of the STA and a new listen interval value of the STA; and
   receiving from the AP, by the STA, a response frame in response to the request frame,
   wherein the operation mode of the STA is set to one of a traffic indication map (TIM) mode and a non-TIM mode,
   wherein when the operation mode of the STA changes to the TIM mode, the new listen interval value indicates an interval that the STA wakes to receive a beacon frame, and
   wherein when the operation mode of the STA changes to the non-TIM mode, the new listen interval value indicates an interval that the STA transmits at least one Power Save (PS)-Poll or trigger frame to the AP.

2. The method of claim 1, wherein the request frame comprises at least one of a first indicator indicating whether the STA switched from the TIM mode to the non-TIM mode and a second indicator indicating whether the STA switched from the non-TIM mode to the TIM mode.

3. The method of claim 2, wherein, when the first indicator indicate that the STA is switched from the TIM mode to the non-TIM mode, the request frame comprises a listen interval field for indicating the new listen interval value of the STA.

4. The method of claim 1, wherein the request frame comprises a listen interval field for indicating the new listen interval value of the STA.

5. The method of claim 4, wherein the request frame comprises at least one of a first indicator indicating whether a wakeup interval field is comprised in the request frame and a second indicator indicating whether the listen interval field is comprised in the request frame.

6. The method of claim 1, wherein the request frame comprises an indicator for indicating whether an association identifier, AID, of the STA needs to change further to the change of operation mode of the STA.

7. The method of claim 6, wherein:
   when the indicator for indicating whether or not an AID of the STA needs to change indicates that the AID needs to change, the response frame comprises an AID field indicating a new AID of the STA and an AID Switch Count field, and
   when the indicator for indicating whether or not an AID of the STA needs to change indicates that the AID does not need to change, the response frame comprises neither the AID field nor the AID Switch Count field.

8. The method of claim 1, wherein the listen interval value is determined based on a calculation with a scaling factor and an actual value.

9. The method of claim 1, wherein the request frame is an association identifier, AID, switch request frame, and the response frame is an AID switch response frame.

10. A station (STA) for updating a listen interval in a wireless communication system, the STA comprising:
   a transceiver configured to transceive a radio frequency signal with an access point (AP); and
   a processor, wherein, upon change of an operation mode of the STA, the processor controls the transceiver to transmit to the AP a request frame including information indicating change of the operation mode of the STA and a new listen interval value of the STA and to receive a response frame in response to the request frame, wherein the operation mode of the STA is set to one of a traffic indication map (TIM) mode and a non-TIM mode, wherein when the operation mode of the STA changes to the TIM mode, the new listen interval value indicates an interval that the STA wakes to receive a beacon frame, and wherein when the operation mode of the STA changes to the non-TIM mode, the new listen interval value indicates an interval that the STA transmits at least one Power Save (PS)-Poll or trigger frame to the AP.

11. The STA of claim 10, wherein the request frame comprises at least one of a first indicator indicating whether the STA switched from the TIM mode to the non-TIM mode and a second indicator indicating whether the STA switched from the non-TIM mode to the TIM mode.

12. The STA of claim 11, wherein, when the first indicator indicate that the STA is switched from the TIM mode to the non-TIM mode, the request frame comprises a listen interval field for indicating the new listen interval value of the STA.

13. The STA of claim 10, wherein the request frame comprises a listen interval field for indicating the new listen interval value of the STA.

14. The STA of claim 13, wherein the request frame comprises at least one of a first indicator indicating whether a wakeup interval field is comprised in the request frame and a second indicator indicating whether the listen interval field is comprised in the request frame.

15. The STA of claim 10, wherein the request frame comprises an indicator for indicating whether an association identifier, AID, of the STA needs to change further to the change of operation mode of the STA.

16. The STA of claim 15, wherein:

when the indicator for indicating whether or not an AID of the STA needs to change indicates that the AID needs to change, the response frame comprises an AID field indicating a new AID of the STA and an AID Switch Count field, and when the indicator for indicating whether or not an AID of the STA needs to change indicates that the AID does not need to change, the response frame comprises neither the AID field nor the AID Switch Count field.

17. The STA of claim 10, wherein the listen interval value is determined based on a calculation with a scaling factor and an actual value.

18. The STA of claim 10, wherein the request frame is an association identifier, AID, switch request frame, and the response frame is an AID switch response frame.

* * * * *